United States Patent
Pärssinen et al.

(10) Patent No.: US 7,299,021 B2
(45) Date of Patent: Nov. 20, 2007

(54) METHOD AND APPARATUS FOR SCALING THE DYNAMIC RANGE OF A RECEIVER FOR CONTINUOUSLY OPTIMIZING PERFORMANCE VERSUS POWER CONSUMPTION

(75) Inventors: Aarno Pärssinen, Espoo (FI); Pauli Seppinen, Espoo (FI); Jussi Vepsäläinen, Helsinki (FI); Mikael Gustafsson, Porvoo (FI); Miikka Hämäläinen, Espoo (FI)

(73) Assignee: Nokia Corporation, Espoo (FI)

( * ) Notice: Subject to any disclaimer, the term of this patent is extended or adjusted under 35 U.S.C. 154(b) by 580 days.

(21) Appl. No.: 10/243,331

(22) Filed: Sep. 13, 2002

(65) Prior Publication Data
US 2003/0124999 A1 Jul. 3, 2003

Related U.S. Application Data

(60) Provisional application No. 60/344,699, filed on Dec. 28, 2001.

(51) Int. Cl.
*H04B 17/00* (2006.01)
(52) U.S. Cl. .............. 455/226.1; 455/250.1; 455/226.1; 375/345
(58) Field of Classification Search ............. 455/67.11, 455/249.1, 295, 296, 311, 251.1, 250.1, 234.1, 455/226.1, 226.2, 226.3, 232.1; 330/129, 330/279; 375/345, 346; 451/343.1–343.3
See application file for complete search history.

(56) References Cited

U.S. PATENT DOCUMENTS

| | | | |
|---|---|---|---|
| 5,179,724 A | 1/1993 | Lindoff ................ 455/76 |
| 5,697,081 A | 12/1997 | Lyall, Jr. et al. ......... 455/249.1 |
| 5,809,400 A * | 9/1998 | Abramsky et al. ......... 455/63.1 |
| 5,815,821 A | 9/1998 | Pettersson .................... 455/575 |
| 5,907,798 A | 5/1999 | Abramsky et al. ........ 455/249.1 |
| 5,909,645 A | 6/1999 | Abramsky et al. ........ 455/249.1 |
| 5,940,749 A | 8/1999 | Cho et al. ................. 455/249.1 |
| 6,026,288 A | 2/2000 | Bronner ....................... 455/343 |
| 6,052,566 A | 4/2000 | Abramsky et al. ......... 455/67.1 |
| 6,175,279 B1 | 1/2001 | Ciccarelli et al. ........... 330/296 |
| 6,329,805 B1 * | 12/2001 | Bracht et al. ............. 324/76.12 |
| 6,965,655 B1 * | 11/2005 | Mostov et al. .............. 375/345 |
| 6,978,125 B2 * | 12/2005 | Lindell et al. ........... 455/183.1 |
| 2003/0064695 A1 * | 4/2003 | Shi ............................. 455/302 |

FOREIGN PATENT DOCUMENTS

| | | |
|---|---|---|
| EP | 0999649 A2 | 10/2000 |
| WO | WO-97/41643 | 6/1997 |
| WO | WO97/41643 * | 11/1997 |
| WO | WO-99/45653 | 10/1999 |
| WO | WO 00/18023 * | 3/2000 |
| WO | WO-00/18023 | 3/2000 |

* cited by examiner

*Primary Examiner*—Blane J. Jackson
(74) *Attorney, Agent, or Firm*—Harrington & Smith, PC

(57) ABSTRACT

Methods and apparatus are disclosed for operating a RF receiver. The method executes, during operation of the RF receiver, by periodically determining existing RF receiver operational conditions; determining RF receiver performance requirements based at least in part on the determined existing RF receiver operational conditions; and by allocating power consumption between RF receiver functional blocks in accordance with the determined RF receiver performance requirements and in accordance with a behavior model of at least one of the RF receiver as a whole and individual functional blocks of the RF receiver. The method may also monitor the resulting RF receiver signal quality to determine if allocation of power consumption has resulted in an optimum allocation of the power consumption.

64 Claims, 14 Drawing Sheets

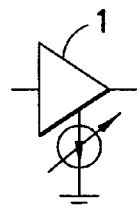
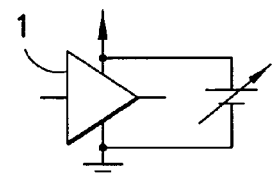
FIG.1A    FIG.1B
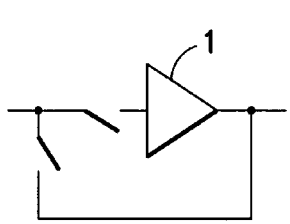
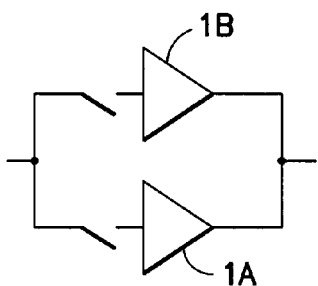
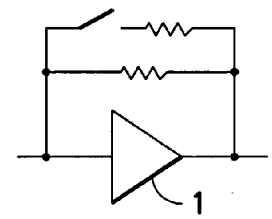
FIG.1C    FIG.1D    FIG.1E
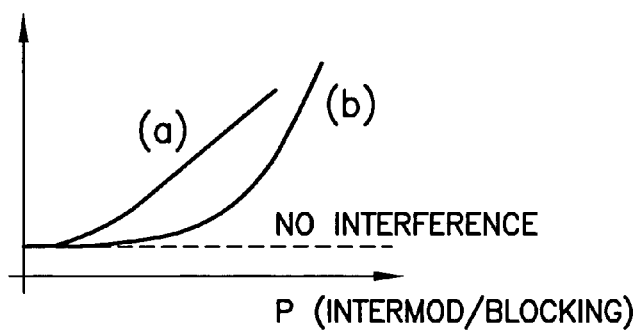
FIG.2

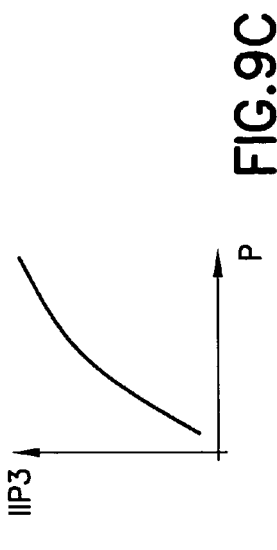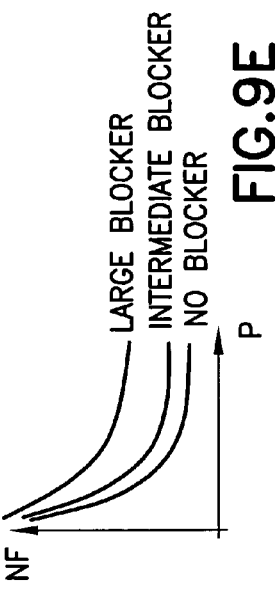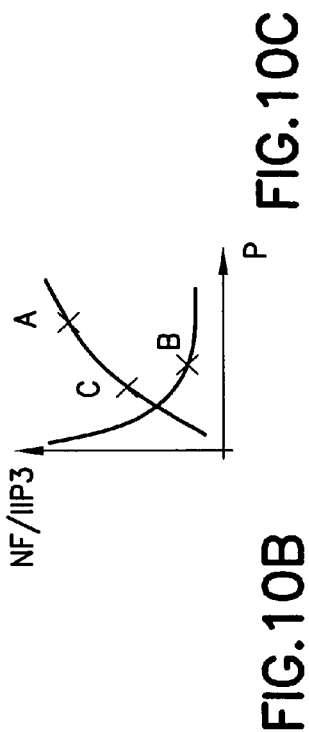

$$NF_{RX} = RSS - SNR_{min} - N_{TH} \quad \text{FIG.11A}$$

$$NF_{IC} = NF_{RX} - L_{duplex} = RSS - SNR_{min} - N_{TH} - L_{duplex} \quad \text{FIG.11B}$$

$$NF_{IC} = k(RSS - MDS - 3) + NF_{IC,MDS} \quad \text{FIG.11C}$$

$$NF_{IC} = m(RSS - MDS)^2 + NF_{IC,MDS} \quad \text{FIG.11D}$$

$$D_{TOT} = N_{TH} + NF_{RX}(RSS) + P_{IMD3,in}(RSS) \quad \text{FIG.11E}$$

$$SNR_{min} = RSS - D_{TOT} \quad \text{FIG.11F}$$

$$P_{imd3in,max} = 10 \lg \left( 10^{\frac{D_{TOT}}{10}} - 10^{\frac{N_{TH} + NF_{RX}(RSS)}{10}} \right)$$
$$= 10 \lg \left( 10^{\frac{RSS - SNR_{min}}{10}} - 10^{\frac{N_{TH} + NF_{IC}(RSS) + L_{duplex}}{10}} \right)$$

FIG.11G $$IIP3 = 3/2 P_{IMD3,source} - 1/2 P_{imd3in,max}$$
$$= 3/2 P_{IMD3,source} - 1/2 \left[ 10 \lg \left( 10^{\frac{RSS - SNR_{min}}{10}} - 10^{\frac{N_{TH} + NF_{IC}(RSS) + L_{duplex}}{10}} \right) \right]$$

FIG.11H $$P_{IMD2, source} = P_{block} - \Delta P_{AM} - P_{outband}$$  FIG.11I $$P_{IMD2, source} = D_{TOT} - \Delta P_{IMD2}$$  FIG.11J $$\begin{aligned}
IIP2 &= 2P_{IMD2,source} - P_{IMD2\,in,max} \\
&= 2(P_{block} - \Delta P_{AM} - P_{outband}) - (D_{TOT} - \Delta P_{IMD2}) \\
&= 2(P_{block} - \Delta P_{AM} - P_{outband}) \\
&\quad - 10\lg\left(10^{\frac{RSS-SNR_{min}}{10}} - 10^{\frac{N_{TH}+NF_{IC}(RSS)+L_{duplex}}{10}}\right) + \Delta P_{IMD2}
\end{aligned}$$

FIG.11K $$\begin{aligned}
D_{TOT} &= N_{TH} + NF_{RX}(RSS) + N_{RX}(P_{block}) \\
&\quad + P_{IMD3,in}(RSS, P_{IMD3,source}) + P_{IMD2,in}(RSS, P_{IMD2,source})
\end{aligned}$$

FIG.11L

METHOD AND APPARATUS FOR SCALING THE DYNAMIC RANGE OF A RECEIVER FOR CONTINUOUSLY OPTIMIZING PERFORMANCE VERSUS POWER CONSUMPTION

CLAIM OF PRIORITY FROM A COPENDING PROVISIONAL PATENT APPLICATION

This patent application claims priority under 35 U.S.C. 119(e) from copending provisional patent application No. 60/344,699, filed on Dec. 28, 2001.

TECHNICAL FIELD

These teachings relate generally to radio frequency (RF) receivers and, more specifically, relate to methods and apparatus for optimizing the performance of receivers such as those found in cellular telephones and other types of mobile communication devices and terminals.

BACKGROUND

The following abbreviations are herewith defined.
ADC analog-to-digital converter
AM amplitude modulation
ASIC application specific integrated circuit
BB baseband
BER bit error rate
BLER block error rate
CDMA code division multiple access
CPU central processing unit
CRC cyclic redundancy check
DPCH dedicated physical channel
DS-CDMA direct sequence CDMA
DSP digital signal processing
Ec/Io code power-to-in-band interference ratio
EVM error vector magnitude
FDD frequency division duplexing
FPGA field programmable gate array
IC integrated circuit
ICP input compression point
IF intermediate frequency
IIP2 second-order input intercept point
IIP3 third-order input intercept point
IMD2 second-order intermodulation product
IMD3 third-order intermodulation product
ISI intersymbol interference
LNA low noise amplifier
LO local oscillator
MDS minimum detectable signal
MS mobile station
NF noise figure
QoS quality of service
RX receiver
RF radio frequency
RSS received signal strength
SIR signal-to-interference ratio
SNR signal-to-noise ratio
TX transmitter
VCO voltage controlled oscillator
WCDMA wide bandwidth CDMA
3G third-generation (cellular communications system)

The dynamic range requirements of a radio receiver are normally defined by the system specifications assuming worst-case operational conditions. However, the worst case conditions are rarely encountered during the typical operation of the receiver. In general, the strength of the received signal and any interfering signals depends on the distance from the transmitter and on the particular radio channel, including fading and other effects.

Substantially all radio receivers in mobile terminals, such as cellular telephones and other types of mobile receivers use some type of automatic gain control mechanism in the receiver for compensating for dynamically changing reception conditions. The total gain of the receiver is adjusted to the desired level for the received signal detector or analog-to-digital converter (ADC) using either analog or digital gain control signals. These control signals steer the gain of the RF, baseband and possibly IF blocks. The gain is typically set by the value of the received signal strength (RSS) at the received radio channel, or by the total signal strength at the input of the ADC, using some specific algorithm. The gain control can be also based on the level at the ADC input if a part of the channel filtering or despreading in a CDMA system is performed in the digital domain. All of these techniques are well-known and are employed in many cellular receivers.

In addition to gain control, more sophisticated control methods have also been presented for radio reception under dynamically changing conditions.

In general, the trade-off between power consumption and dynamic range can be utilized to minimize the power consumption at each moment of time. Also, the modularity of base station applications could benefit from the use of a modular design. Often these techniques control the biasing current or supply voltage of one or several receiver blocks. Referring also to FIG. 1 there are shown various prior art techniques for implementing adaptive reception in a receiver. These include adjusting the biasing current to a device 1 (FIG. 1A), adjusting the supply voltage of the device 1 (FIG. 1B), bypassing a stage (FIG. 1C), switching between stages (FIG. 1D), and switchable feedback (FIG. 1E). The power consumption can thus be scaled in various ways, such as by adjusting the bias current as in FIG. 1A, or by switching between parallel stages as in FIG. 1D, or bypassing certain devices that can also be powered down (FIGS. 1B and 1C). The controlled device 1 can be a single transistor, an amplifier, a mixer, a filter or any other active single component or multiple component circuit block in a radio receiver.

Reference in this regard can be made to, for example, U.S. Pat. Nos. 5,179,724, 6,026,288 and 5,697,081, as well as to WO97/41643, WO00/18023 and EP0999649A2.

Overall control is normally based on one or several measured parameters. These include the received signal strength (RSS), the signal-to-interference ratio (SIR) (or its estimate at the detector), Ec/Io in CDMA systems (see U.S. Pat. No. 5,940,749, WO00/18023) and the total power at RF, IF or baseband (see WO97/41643). Also, interfering signals can be estimated by measuring neighboring channels at separate moments of time utilizing the same circuitry as the received signal (see EP0999649A2). Intermodulation can be estimated separately by switching a controllable attenuator into the signal path (see, for example, U.S. Pat. No. 5,907,798, U.S. Pat. No. 5,909,645, U.S. Pat. No. 6,052,566 and U.S. Pat. No. 5,697,081). Also, the known transmitted power can be utilized for power scaling in a receiver in those cases where transmission and reception occur simultaneously (see, for example, U.S. Pat. No. 5,815,821, WO99/45653 and WO00/18023.)

However, in general all of these techniques exhibit as a weakness a requirement to make accurate estimates of the received signal and also the level of the total interference.

Typically, the control is based on some fixed thresholds that categorize both the received signal and the interference to be either "weak" or "strong".

One standard requirement in cellular communication systems is to measure the RSS. However, the RSS describes only the level of the received radio signal (over the channel bandwidth, for example) with a certain accuracy. It is also possible to estimate the SIR in the band of interest using well-known digital techniques, and the estimation of the SIR is currently a required measurement in some radio systems, such as in the 3G CDMA system. Unfortunately, the total interference arises from several sources, which are very difficult or impossible to distinguish from one another based on conventional digital algorithms, in particular those algorithms whose complexity would not be unreasonable to execute in a mobile station employing its local computing resources. For example, the sources of interference in a CDMA system include at least: interference from other code channels of the same base station, interference from other code channels in the same frequency band from other near-by base stations, interference from jamming signals, thermal noise in the band of interest, as well as additional noise and interference caused by the RF circuitry of the receiver itself.

The last factor, i.e., the additional noise caused by the RF receiver circuitry, includes at least a noise figure (NF) of the receiver, additional interference due to intermodulation and phase noise of the oscillators in the receiver, additional noise due to intersymbol interference (ISI) and, in digital radio systems, quantization noise. All of these are well-known phenomena in radio reception.

In full-duplex systems, where reception and transmission occur simultaneously (such as in CDMA systems), the undesired leakage of the transmitted signal into the receiver can also cause a problem. Also, some receiver architectures have their own specific problems that give rise to additional interference, such as AM-distortion in direct conversion receivers.

In any event, it should be appreciated that without intelligent logic it is practically impossible to separate these different sources of interference and to determine their relationship to the SIR. As a result, conventional radio receivers are designed to operate under the worst-case conditions by always operating at the maximum possible performance (and power consumption) level.

As was noted above, in conventional radio receivers it is known to adjust the gain according to the RSS or signal level at the ADC input. As the reception parameters typically change during operation when the gain control is applied, the power consumption is typically optimized with respect to certain parameters such as the noise figure (NF), according to the worst-case scenario. Because the total interference cannot be predicted at each moment of time, additional headroom must be made available under typical operating conditions. Practically speaking, the gain control is required in all cellular systems to extend the signal range of the desired channel at the input of the receiver. However, a variation in the gain control does not typically imply that the power consumption of the receiver is scaled accordingly.

The gain and other receiver parameters are typically controlled using logic based on the RSS and the total interference after the preselection filter, or after some other filtering stage. Hence, the decision is based on logic that does not indicate whether an out-of-band interferer will alias with a signal in the band of interest due to intermodulation. The out-of-band interferer(s) can thus be filtered out of the receive chain so that they can only degrade the performance due to intermodulation, gain compression or desensitization, such as by raising the noise level or noise floor of the receiver circuitry. Hence, the estimate is based on information that does not have a straightforward relationship to the interference in the RF band of interest. In that the decision logic is typically based simply on threshold values and thus gives, at best, only a coarse approximation of the receiving environment, the result is that certain receiver parameters can be set at levels that exceed what is required in the particular receiving environment.

Only in certain limited cases can the interferer be defined with reasonable accuracy in advance. For example, the linearity of the receiver can be increased using additional current when some known interference (normally due to TX leakage) exists in the system. In this case the logic can react only to a very limited number of conditions and, typically, the receiver performance is made significantly better than what is actually required.

In conventional approaches it is also known that interfering signals can be measured with the same receiver signal path as the actual reception signal path, but at the different moments of time. For example, in GSM there are mandatory measurements of other radio channels that can be measured, and their values can be used in the control logic. A switchable attenuator in the signal path can also be used to estimate the ratio between intermodulation and other interference sources in the band of interest, as the slopes of the different non-ideal signals differ as a function of signal power.

A combination of two or more of the foregoing techniques have also been used in the prior art for receiver control purposes.

It should be noted that instead of the absolute signal levels (e.g., the RSS or the total power at some node), the SIR, or the SNR, or, in a CDMA system, the Ec/Io can be utilized as well by the receiver control logic.

SUMMARY OF THE PREFERRED EMBODIMENTS

The foregoing and other problems are overcome, and other advantages are realized, in accordance with the presently preferred embodiments of these teachings.

This invention describes an apparatus, a method and an algorithm for controlling the dynamic range of a radio receiver. The algorithm uses a signal monitoring circuit that can measure simultaneously the total power due to intermodulation falling within a band of interest from all radio channels passing a preselection (a band selection) filter of a receiver circuit. In addition to the intermodulation product the algorithm uses the received signal strength (RSS) and the total received power passing the preselection filter to determine the required reception parameters for the receiver. Other available parameters, such as the transmitted power level, may also be used. Based on the calculated parameters the algorithm optimizes the power supply currents and other controllable parameters of the receiver blocks such that the required performance can be maintained under dynamic conditions, while consuming a minimum amount of power supply current.

This invention provides a monitoring circuit and associated logic to control the dynamic range of a radio receiver based on several parameters, and thus makes it possible to continuously optimize the receiver performance, for example, according to a minimum necessary power consumption to obtain a desired quality of service (QoS). In that the amount of interference caused by different interference sources can be distinguished from one other, the optimization of the receiver performance can be accurately performed. The complete received spectrum passing a preselection filter (band filter), and/or the LNA, is detected with the monitoring circuit and any intermodulation that falls in the reception band is separated from the blocking signal. If the detection can be made faster than the required control range requires, the detector can be powered down momentarily to reduce the average power consumption.

These teachings enable different types of interference in the RF band of interest to be separated from one another. The measurements may be performed continuously and at the same time as normal signal reception, without disturbing the normal signal reception. The measurements can also be accomplished discretely at certain moments of time during signal reception, for example if fast, real-time control is not required. All of the interfering signals can be detected simultaneously as the input to the detector is wide-band. However, narrow-band signal processing is preferably employed after the detector to conserve power.

In accordance with these teachings a radio receiver can be programmed in substantially real time to operate with a minimum necessary power consumption and, furthermore, the additional headroom may be reduced when the power consumption is optimized.

These teachings also make it possible to change the noise figure (NF) performance as compared to the use of RSS (or some other parameter) in those cases where the SIR or SNR requirement of the detected signal varies. Such cases may be different data rates and quality requirements (BER or BLER), for example, between speech and data. These teachings also make it possible to reduce the quality of service (QoS), if permitted, in the case where the battery charge is low in order to extend the talk time or the stand-by time.

In CDMA systems where the capacity is limited by noise and interference, and also by other transmitted channels in the RF band of interest, it is possible to trade-off between noise, interference and other code channels to achieve the required performance.

The use of these teachings also makes it possible to tune receivers during production with a simple method to meet a particular RF specification, even in those cases where the device under test will fail. The circuitry yields evidence of the possible problem, and by tuning the currents of the different receiver blocks in an appropriate manner, the performance can be automatically tuned to meet the RF specification.

It is important to note that the teachings of this invention go well beyond the simple control of power consumption in one or several receiver blocks based on one or several measurements. This invention instead more particularly resides in a control method for a radio receiver, rather than in a circuit technique to control the power consumption of any active circuit in the receiver. An important aspect of this invention includes a method to distribute the available headroom for internal noise and distortion in the receiver between the noise figure, the interference due to large signals (intermodulation and blocking) and other non-ideal signal reception conditions and occurrences in an adaptive manner based on received signal strength measurements and on the measured interferers. This invention also provides a method that can utilize the information from different types of interferences and combine them adaptively to optimize the performance of the receiver to the currently received RF band (with respect to the power consumption). The method employs a specialized signal monitoring circuit that can separate input signals causing intermodulation tones in the RF band of interest from other blocking signals, and also employs logic that can estimate the phase noise specification of the local oscillator by changing the input signal bandwidth of the signal monitoring circuit.

These teachings thus provide a method for operating a radio frequency (RF) receiver that executes, during operation of the RF receiver, by periodically determining existing RF receiver operational conditions; determining RF receiver performance requirements based at least in part on the determined existing RF receiver operational conditions; and by allocating power consumption between RF receiver functional blocks in accordance with the determined RF receiver performance requirements and in accordance with a behavior model of at least one of the RF receiver as a whole and individual functional blocks of the RF receiver. The method may also monitor the resulting RF receiver signal quality to determine if allocation of power consumption has resulted in an optimum allocation of the power consumption.

Also disclosed is a communications device, such as a cellular telephone or a personal communicator, that includes a RF receiver. The device further includes monitoring circuitry, operable during operation of the RF receiver, for periodically determining existing RF receiver operational conditions and for determining RF receiver performance requirements based at least in part on the determined existing RF receiver operational conditions. The device further includes power control circuitry for allocating power consumption between RF receiver functional blocks in accordance with the determined RF receiver performance requirements, and in accordance with a behavior model of at least one of the RF receiver as a whole and individual functional blocks of the RF receiver.

The monitoring circuitry measures interfering signals and determines received signal distortion due to at least one of intermodulation and blocking, and may also measure at least one of the received signal and internal conditions of a transceiver of which the RF receiver is apart.

The monitoring circuitry operates to monitor a received signal in at least one of the RF, IF and BB sections of the RF receiver, where monitoring the received signal at BB can include making a measurement of at least one of RSS, SIR, Ec/Io, BER and BLER.

In the presently preferred embodiment the monitoring circuitry operates to determine at least one of: the gain of the RF receiver, a correct value of the gain of the RF receiver, the noise factor of the RF receiver, the third-order input intercept point of the RF receiver, the second-order input intercept point of the RF receiver, the input compression point of the RF receiver, and the phase noise of the RF receiver.

The power control circuitry is responsive to resulting RF receiver signal quality for determining if the allocated power consumption is an optimum allocation of the power consumption, and operates by at least one of: varying at least one of the biasing current and the power supply voltage, by bypassing at least one stage, by switching between stages, and by changing feedback.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIGS. 1A—1E, collectively referred to as FIG. 1, show prior art techniques for implementing adaptivity in a receiver by adjusting the biasing current, adjusting the power supply voltage, bypassing a stage, switching between stages and using switchable feedback, respectively;

FIG. 2 is a graph showing a minimum detectable signal in a receiver system (sensitivity) when the performance is dominated by (a) intermodulation and (b) blocking, where the x-axis represents the intermodulation or blocking power;

FIG. 3A illustrates the effect of a blocking signal and the potential for channels to cause blocking in a CDMA system with 12 radio channels, while

FIGS. 9A–9E, collectively referred to as FIG. 9, illustrate behavioral models for certain receiver parameters as a function of power consumption: specifically gain, noise figure, IIP3, noise figure with process variations (dashed lines) and noise figure with different blocking signal levels, respectively;

FIGS. 10A–10C, collectively referred to as FIG. 10, illustrate power consumption requirements for examples A, B and C from the NF and IIP3 perspective, where the required power consumption can be chosen to be the minimum necessary that meets both conditions;

FIGS. 11A–11L, collectively referred to as FIG. 11, show a number of mathematical expressions that are solved during the execution of the algorithm shown in FIG. 4 or during the generation of the lookup table that maps the measurement to the receiver control in accordance with the algorithm;

DETAILED DESCRIPTION OF THE PREFERRED EMBODIMENTS

In accordance with an aspect of these teachings the intermodulation products that can be aliased in the RF band of interest are separated from other sources of interference. A presently preferred algorithm estimates the role of intermodulation in the system performance separately from other sources of interference. This is achieved by using a circuit that can detect the components arising from other interfering signals. In the presently preferred embodiment this circuit is one described by Pauli Seppinen, Aarno Pärssinen and Mikael Gustafsson, "Intermodulation Detector for a Radio Receiver", U.S. patent application Ser. No. 10/034,643, filed on even date herewith and incorporated by reference herein, although the circuit is not limited to only this particular one.

In many cases the power consumption of the receiver, or one particular block in the receiver, is dominated by the intermodulation due to the third-order nonlinearity that is inherent in the system specification. Such a situation is, however, rare in a practical embodiment, in spite of a relatively stringent requirement for the third-order input intercept point (IIP3) given in the system specification (defined for the worst case condition.) Therefore, under most operating conditions the receiver performance exceeds what is actually required.

Compression and desensitization are other parameters in the radio reception that are related to the large signal environment. However, their consequences are different from a system perspective. Compression and desensitization result from a single large blocking signal or the total signal power passing through a nonlinear device. In general, compression reduces the gain of the circuit and desensitization increases the noise in the circuit. Hence, in the blocking situation both effects reduce the dynamic range. On the other hand, intermodulation (IIP3) brings undesired signals from other radio channels into the band of interest. The effect is more serious than that resulting from blocking as smaller signal levels can cause an unacceptable degradation in the performance of the receiver, as compared to blocking. It has been estimated that in certain cases the blocking power may need to be over 15 dB greater than the intermodulation power in order to cause the same degradation in sensitivity. This difference is illustrated in FIG. 2, which shows the minimum detectable signal in the system (sensitivity) when the performance is dominated by (a) the intermodulation, and (b) blocking. The x-axis presents the intermodulation or blocking power.

Figure 3A:
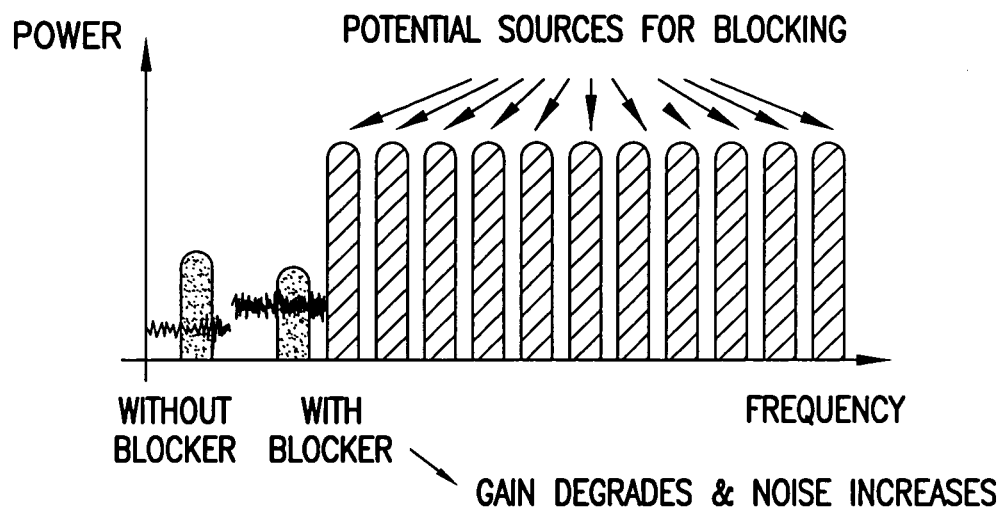
Figure 3B:
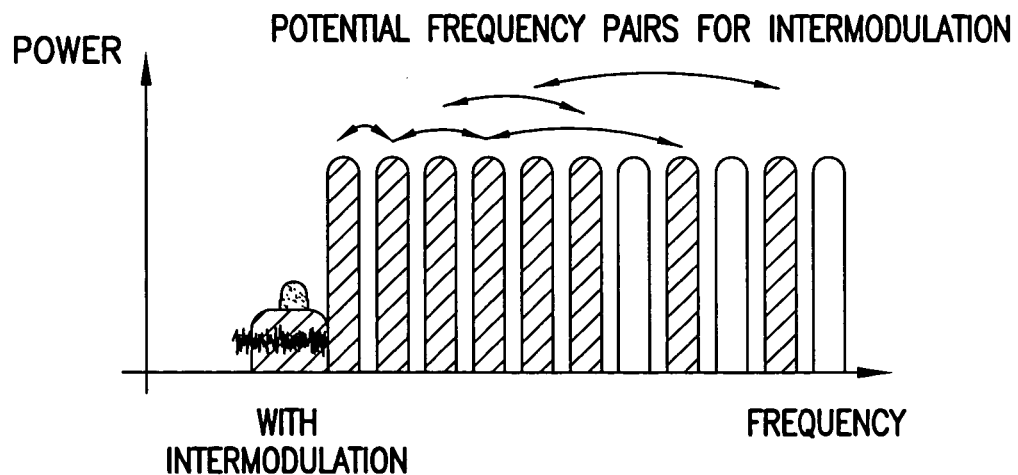
FIG. 3B shows the effect of intermodulation and the potential for channels to cause interference due to intermodulation in a CDMA system with 12 radio channels, where in both examples the received channel is assumed to be located in the lowest frequency band, the potentially interfering signals are shown in solid black, and the other channels are shown in white.

However, intermodulation requires a certain combination of frequencies, $f(RF)=2(f(D1)-f(D2))$, where $f(RF)$ is the frequency of the desired signal and $f(D1)$ and $f(D2)$ are the frequencies of the two undesired signals causing distortion, while blocking can be caused by any signal or combination of signals passing the preselection filter, as shown in FIG. 3. More specifically, FIG. 3A illustrates the effect of the blocking signal and potential channels to cause blocking in a CDMA system with 12 radio channels, while FIG. 3B shows the effect of intermodulation and potential channels to cause interference due to intermodulation in a CDMA system with 12 radio channels. In both examples the received channel is located at the lowest frequency band, the potentially interfering signals are marked in solid black and the other channels are marked in white.

Hence, it can be appreciated that if the decision is based only on one of the previous two parameters the performance cannot be uniquely optimized due to the different effects from the system point of view. Also, it should be appreciated that although at least theoretically a certain relationship exists between compression and intermodulation, the two nonlinear phenomena can be dominated by different devices in the receiver. Hence, the relationship between blocking and intermodulation depends as well on the circuit topology, and the optimum performance is preferably estimated accordingly.

Because the intermodulation power is separated from the blocking power by the application of the teachings of this invention, it becomes possible to use less current in the receiver at any time when a relatively large blocker exists, but the frequency combinations at the input of the receiver do not produce intermodulation products in the RF band of interest.

The internal optimization is preferably accomplished using a behavioral model for each receiver block, and the total receiver performance is then determined from the models of the separate receiver blocks. A discussion of the presently preferred behavioral models is made below.

It should be noted that the receiver performance model may also be defined from the simulated or measured results of the entire receiver as well.

Figure 4:
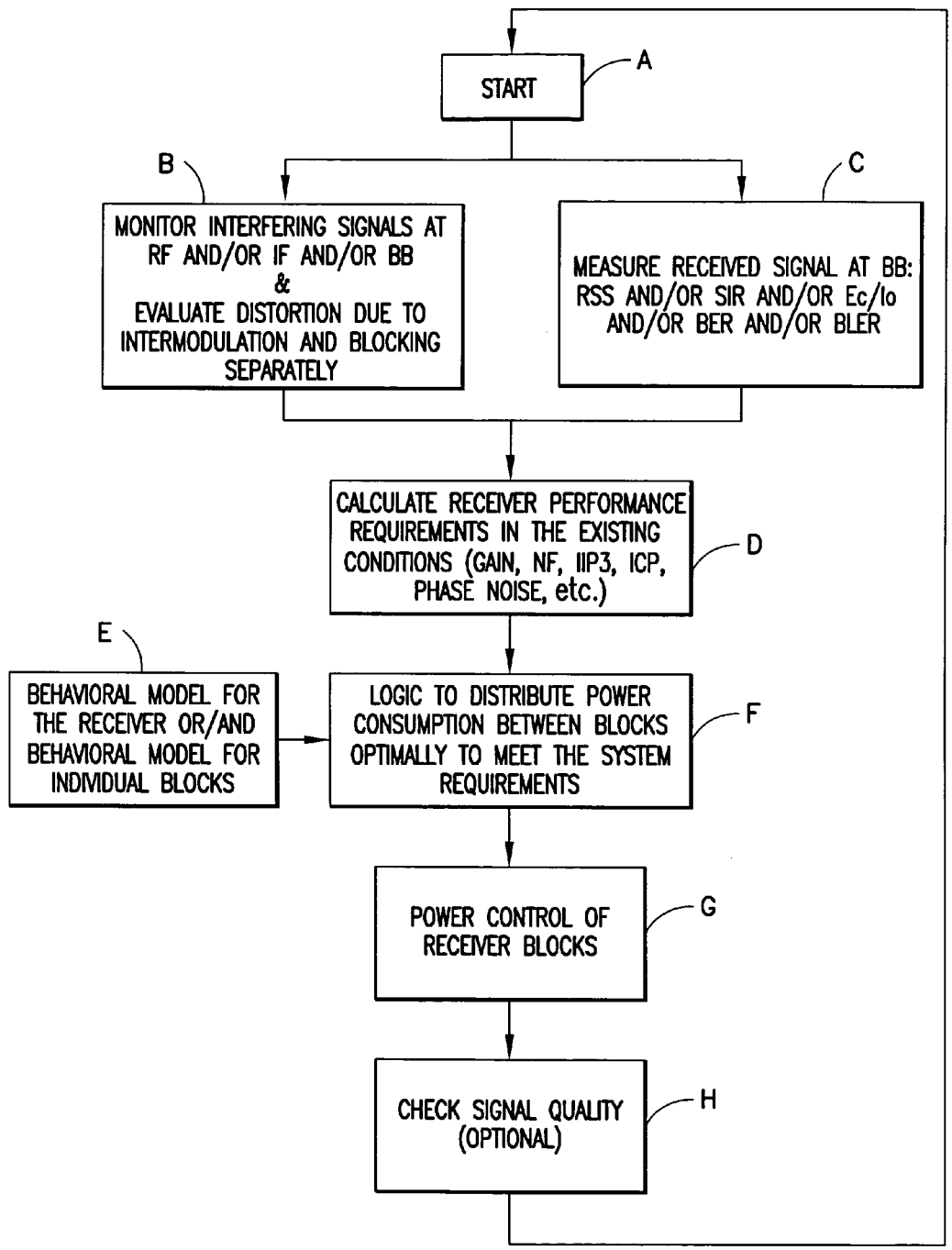
FIG. 4 is a logic flow diagram that illustrates the receiver operational control principle in accordance with this invention.
Figure 5:
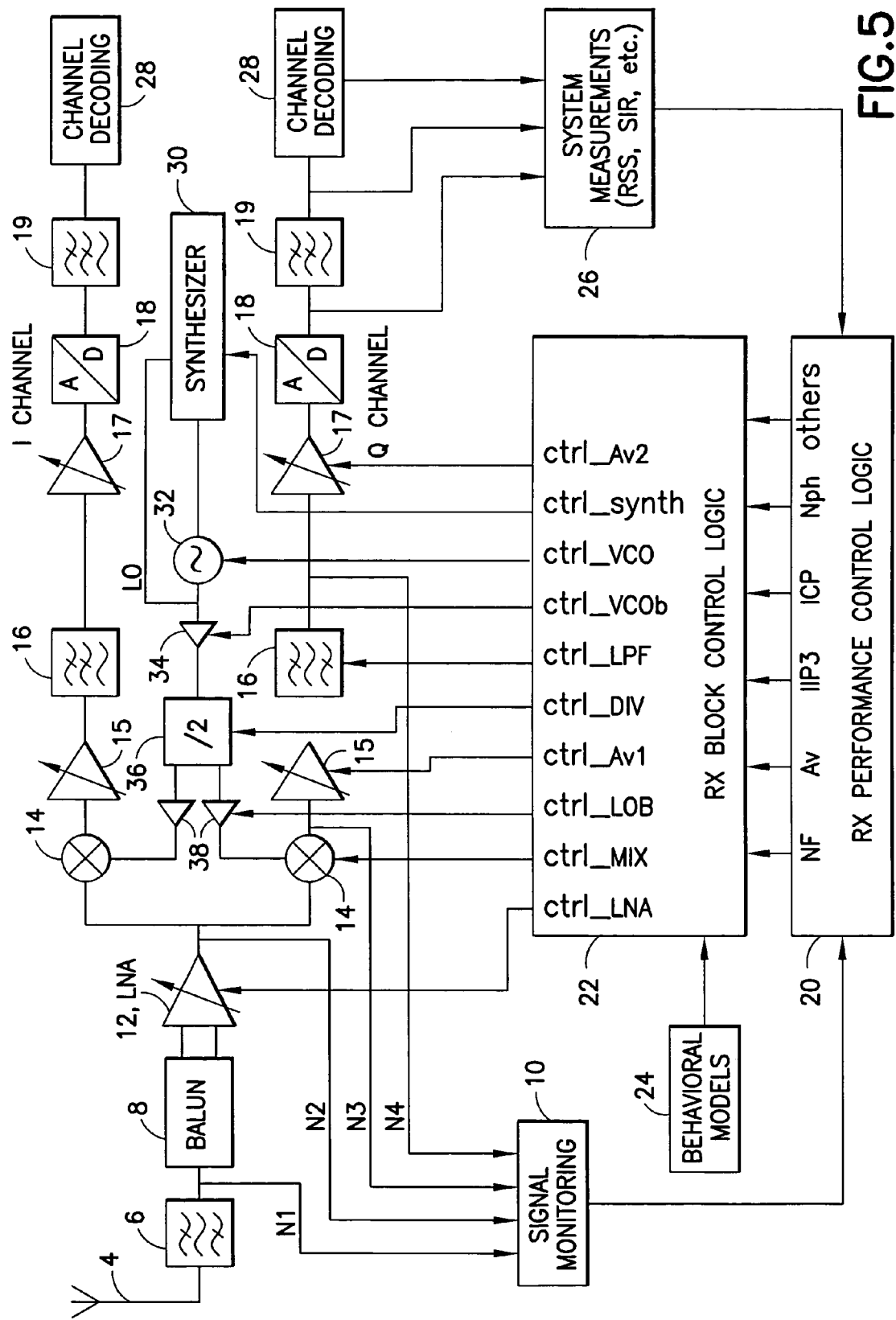
FIG. 5 is a block diagram of an adaptive receiver that includes the control logic in accordance with this invention, wherein a direct conversion receiver architecture is shown by example but not by way of a limitation.

The teachings of this invention pertain to a control method for a radio receiver that utilizes at least one signal monitoring circuit at RF, IF or analog baseband, or at digital IF or baseband, that can separate different types of interference, that employs measurements done at the digital baseband, as well as logic to calculate the receiver parameters from the measurements and known system conditions, logic to define an optimal power distribution between receiver blocks to accomplish the necessary receiver parameters using behavioral models of the receiver and/or individual blocks, and control logic to adjust the power consumption of the different blocks in the receiver using, for example, techniques such as those illustrated in FIG. 1. The overall control method is shown in FIG. 4, and a block diagram of an adaptive receiver according to the invention is shown in FIG. 5. While a direct conversion receiver architecture is used for the illustrated example of FIG. 5, the teachings of this invention are not limited for use with only direct conversion architectures, and systems that generate one or more Intermediate Frequencies (IFs) can use the teachings of the invention as well, such as superheterodyne or other receiver architectures. The nodes N1, N2, N3 and N4 from which the signal is monitored by signal monitoring block 10 are examples of potential nodes, and should not be viewed in a limiting sense. In the simplest form only one measurement node is required, and a presently preferred mode for implementation is to make the measurements at RF at the node N2 between the low noise amplifier (LNA) 12 and the downconversion mixer 14. The receiver in FIG. 5. contains in-phase (I) and quadrature (Q) channels, and for simplicity only the blocks of the Q channel are shown as being controlled. However, it should be apparent to those skilled in the art that both the I and the Q channels should be controlled in the same manner. Also, the monitoring circuitry 10 can be connected either to one channel or to both channels simultaneously. In FIG. 5, the RX performance control logic 20, RX block control logic 22 and the behavioral models 24 are drawn as separate blocks to improve the clarity. However, they can all be combined in a practical implementation into a common logic block. The three blocks 20, 22 and 24 are employed to implement the teachings of this invention, in addition to the signal monitoring circuitry 10 that can separate intermodulation from blocking. In the presently preferred embodiment the intermodulation detection circuit is the one referenced above as being described by Pauli Seppinen, Aarno Pärssinen and Mikael Gustafsson, "Intermodulation Detector for a Radio Receiver", U.S. patent application Ser. No. 10/034,643, filed on even date herewith and incorporated by reference herein in its entirety. An overview of this circuit is described below in relation to FIG. 14.

For completeness, FIG. 5 also shows a receive antenna 4, an input bandpass (preselection) filter 6 and a balun 8 that feeds the LNA 12. The downconversion mixers 14 receive their mixing frequencies from a local oscillator (LO) that includes a synthesizer 30, voltage controlled oscillator 32, buffer 34, divide by two block 36 and further buffers 38. The outputs of the downconversion mixers 15 are applied to variable gain amplifiers 15, low pass filters 16, second variable gain amplifiers 17, analog to digital converters ADCs 18, baseband low pass filters 19 and channel decoders 28. A baseband (BB) systems measurement block (RSS, SIR, etc.) 26 generates an output signal that is applied to the RX performance control logic 20, in combination with the output from the signal monitoring block 10. The RX performance control logic block 20 generates values for NF, Av, IIP3, ICP, Nph, and possibly other controls, and outputs these values to the RX control logic block 22. The RX control logic block 22 in turn controls the various receiver blocks, in cooperation with the output of the behavioral models block 24.

The operation of the individual process blocks in FIG. 4 will now be described. Preferably, but not necessarily, the control procedure is executed once during one time slot during radio reception.

The method starts at Step A, and at Steps B and C the method monitors interfering signals and measures the received signal. More specifically, at Step B the signals can be monitored at RF, at IF (if the receiver has an intermediate frequency) and/or at BB. The signal monitoring in this context means all possible signal monitoring techniques that can be done before the channel selection filtering. The preferred node to monitor for undesired signals is before the RF mixer 14 (or with a system having wide-band IF processing also at the output of the mixer). This location is preferred for two reasons. First, the preceding RF amplification by the LNA 12 relaxes the gain requirements of the monitoring circuit 10, but does not limit the band of possible interferers significantly. Second, after the RF mixer 14 the band is typically filtered in blocks 16 in the direct conversion architecture to relax the linearity requirements of the baseband blocks. Hence, wideband power detection becomes impossible after the lowpass filtering operation. In the superheterodyne architecture a significant band limitation occurs at the IF (meaning the first IF if there are several intermediate frequencies). Therefore measurements in a superheterodyne receiver are preferably performed before the first IF filtering to achieve reliable results with the best sensitivity for RF optimization.

Figure 6:
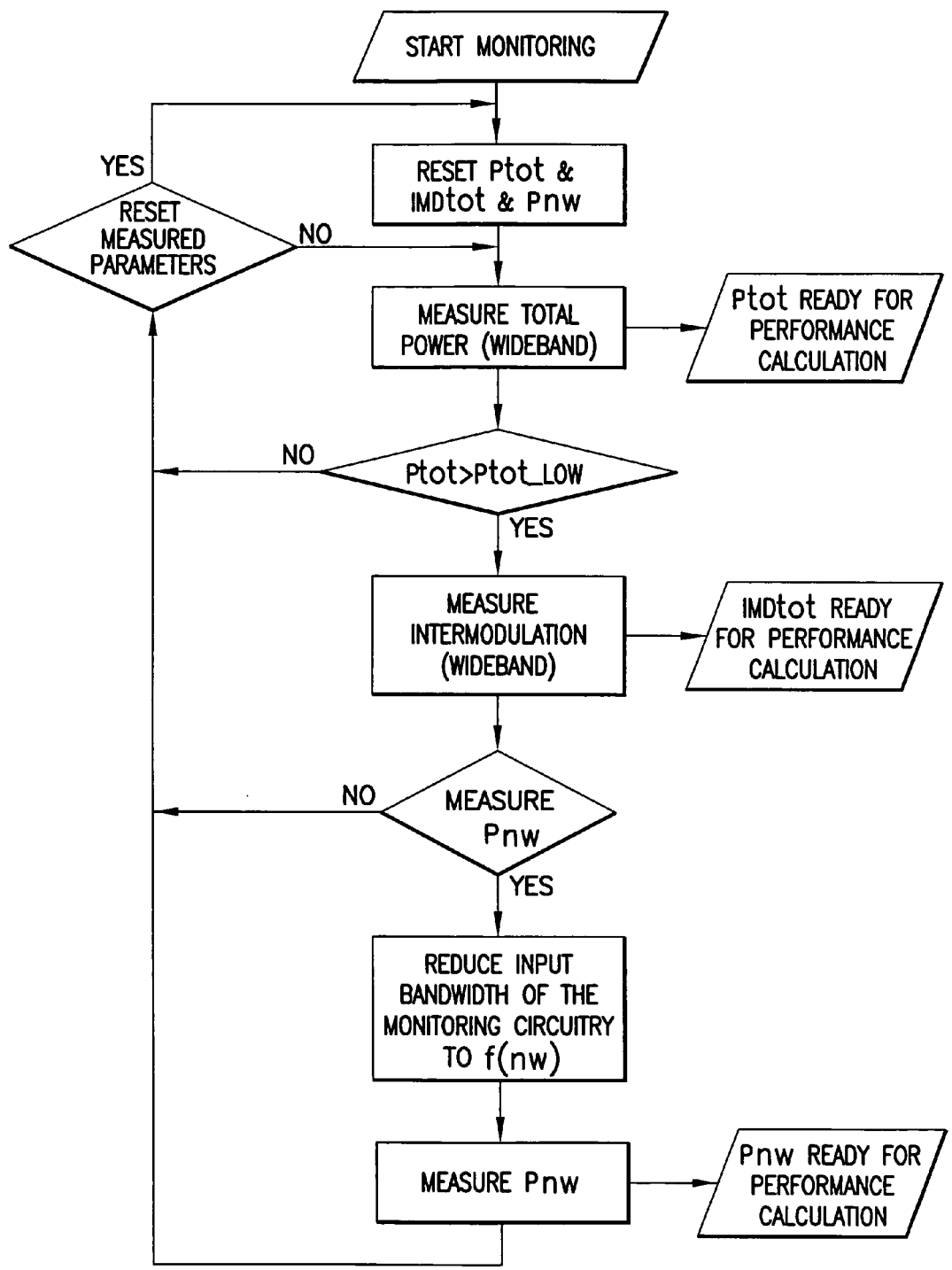
FIG. 6 is a logic flow diagram that illustrates an algorithm for monitoring the total power, the intermodulation power and the power near to the RF carrier frequency.

Analog signal monitoring can be done with one or several different monitoring circuits and separate monitoring circuits can be used to monitor different types of interferers. For example, the intermodulation and the total power can have different monitoring circuits. However, to minimize the circuitry and silicon area in the implementation the preferred mode is as follows. One monitoring circuit (signal monitoring block 10) is connected at the input of the RF mixers 14 is used that can measure both the total power and the intermodulation with a simple configuration step between modes. Hence, these two measurements are not done simultaneously, but assuming that the switching between modes can be done fast enough both measurements can be performed with sufficient accuracy even in fluctuating signal conditions. The required switching between modes can be done most optimally according to FIG. 6. The downconversion to baseband signal is not shown in the algorithm description. There is an option to measure also the frequency difference of the blocking signal from the frequency of interest. This option can be used in the scaling of the LO signal path power (VCO 32, dividers 36, etc.) as will be discussed later. In FIG. 6, the parameters Ptot and IMDtot describe the total power and the interfering power due to intermodulation at the input of the monitoring circuit 10, respectively. Ptot_LOW describes the threshold value under which interfering power levels are insignificant for the system performance. This level is defined based on the sensitivity of the power detector and the algorithm that is used. The power Pnw describes the total power that is close to the received carrier frequency, after the input bandwidth of the monitoring circuit 10 is reduced to the bandwidth given by the f(nw). The use of this measurement with the reduced bandwidth around the RF carrier frequency is described in further detail below.

At Step C the algorithm measures the received signal at BB. Different parameters describing the radio link, such as the RSS or the SIR, can be defined using digital signal processing. Many cellular systems require certain measurements be made with a certain accuracy. The parameters defined at digital baseband and used in this invention can be acquired with conventional digital techniques. The received signal strength (RSS) is a presently preferred mandatory parameter in the method, while the SIR, or actually its estimate, is a useful optional parameter when estimating the performance changes. This is true because of the adaptivity. The Ec/Io is a parameter related to CDMA systems and describes the amount of signal power compared to other code channels and interference in the RF band of interest. The bit error rate (BER) or block error rate (BLER), if available in the system, can be also used in the method. However, with these parameters it is only possible to estimate long term changes in the reception conditions and therefore they are impractical to use in most cases. Also, other parameters may be available in the system. Besides of RSS all of the other parameters are optional for use by the algorithm, but their use in general improves the accuracy of the result.

Figure 7:
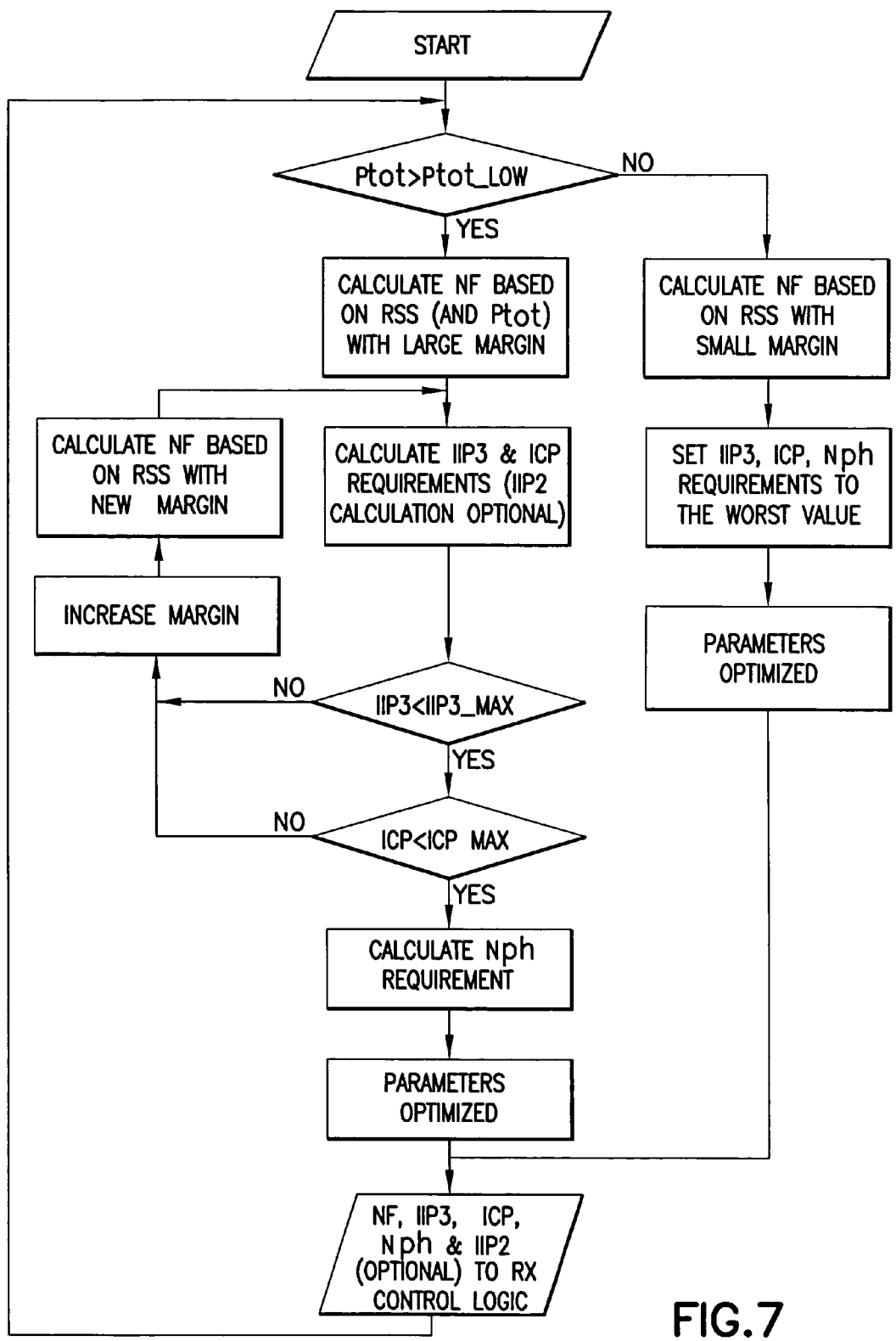
FIG. 7 is a logic flow diagram that illustrates an algorithm for calculating the receiver performance requirements.

At Step D the method calculates the receiver performance requirements. A presently preferred algorithm for this purpose is shown in FIG. 7. An evaluation is first performed as to whether any measurable signal exists in the signal monitoring circuit 10 (or if the signal is above a certain threshold limit). If no interference is observed the noise figure requirement of the receiver is calculated using a small or no margin as compared to a minimum required NF. The calculation of the noise figure is explained in further detail below. Then the requirements of IIP3, ICP, Nph and possibly other receiver parameters that are related to large interferers are set to the values that meet the requirements of the smallest measurable interfering signal level.

In the case where large interfering signals occur, the noise figure requirement is calculated such that the internal noise of the receiver only reserves a part of the additional headroom in the signal-to-interference ratio (SIR), and the remainder of the acceptable interference can be caused by IIP3, ICP or other receiver non-ideal characteristics. The NF, IIP3 and ICP requirements can be calculated as shown below. In direct conversion receivers the second-order input intercept point (IIP2) is also significant. The requirement for IIP2 can thus also be calculated. However, the IIP2 requirement is handled separately because of the completely different tuning mechanisms. If IIP3 and ICP requirements are higher than the maximum achievable with the current receiver (IIP3_max & ICP_max) it is possible to reduce the noise figure requirement and, hence, increase the margin between the internal noise and the maximum acceptable interference.

The phase noise (Nph) requirement for the local oscillator LO (or LOs depending on the receiver architecture) can be calculated based on the total power (Ptot) and/or on the undesired power close the RF carrier (Pnw). There is a certain maximum acceptable phase noise (Nph) for the reception of a modulated channel, which is the limit value when large interferers do not exist. However, it is possible to calculate the phase noise requirement for the local oscillator and the other circuitry (dividers 36, buffers 38, etc.) between local oscillator and mixer 14 LO ports as a function of Ptot or Pnw. Because the phase noise is a function of the power consumption, the total power consumption of the receiver can be scaled according to the phase noise requirement. By measuring the nearby interferers Pnw it is possible to improve the accuracy of the algorithm as the phase noise requirement is reduced as a function of the distance in frequency between received channel and the interfering signal. The phase noise calculation can be performed independently of the IIP3 and ICP characterization, and therefore their order can be changed. However, both parameters add interference and thus some headroom should be reserved for the other parameter when the first requirement is defined.

The calculations for NF, IIP3, ICP, IIP2 and Nph can be performed according to the examples given below. However, these calculation should only be considered as the presently preferred best mode of operation as other mathematical formulas may be developed to yield the same or similar information within the system. Also, other receiver parameters can be specified, although those described are believed to be the most significant ones.

The system specifications in an adaptive system are preferably defined separately for each reception condition. Those parameters that can be used at these occasions are, for example, the received signal strength (RSS), the total power at the input of the receiver ($P_{block}=P_{tot}$) and the power causing third-order intermodulation ($P_{IMD3,source}$). The information of the other code channels in the reception band in a CDMA system can also be useful.

What follows is now a more detailed description of the various calculations that are performed in accordance with the algorithm illustrated in FIG. 4, and in the algorithms shown in FIGS. 6 and 7 that are constituent parts of the algorithm of FIG. 4. Reference is also made to FIG. 11.

NF

The maximum noise figure (NF) can be defined for each input level according to the expression shown in FIG. 11A, where $NF_{RX}$ is the noise figure of the receiver at the antenna 4 connector, $SNR_{min}$ is the minimum required signal-to-noise ratio for detection and $N_{TH}$ is the thermal noise in the band of interest i.e. $N_{TH}=10*\log(kTB)=-174$ dBm/Hz+ $10*\log(B)$. B is the bandwidth of the received channel. All numbers are given in decibels. The maximum noise figure for the system at a sensitivity level can be calculated by setting the sensitivity as RSS. The loss of the components that precede the LNA 12 (or IC) in the receiver are taken into account when calculating the IC requirements. Typically the loss is dominated by the preselection filter 6 or the duplex filter. Hence, the IC NF requirement can be given by the expression shown in FIG. 11B, where $L_{duplex}$ models the total loss between the antenna 4 connector and the IC that embodies the circuitry shown in FIG. 4.

In a radio system specification noise is typically the only parameter that causes interference to the signal when the input signal is at the sensitivity level. Therefore $NF_{IC}+N_{TH}$ and $NF_{RX}+N_{TH}$ should be considered as the maximum interference level at the band of interest ($D_{TOT}$), including noise and distortion of the receiver blocks as well as interference from other code channels in a CDMA system. The NF typically dominates the performance only close to the sensitivity level. It can be specified to be less at higher signal levels to allow some headroom for nonlinearities and other distortion, which normally dominate the performance. This headroom can be used when specifying other parameters. Hence, a linear or a parabolic equation for NF specs at the input of the IC can be calculated. An example of a linear function is shown in FIG. 11C, where MDS is the minimum detectable signal (sensitivity), $NF_{IC,MDS}$ is the noise figure specification at the sensitivity level and k is the slope of the specification, which can be defined by the system designer. All numbers are again in decibels. A typical system specification requires that, with out-of-band interferers, the specification is defined when the received signal is 3 dB above the sensitivity threshold. In order not to disturb that specification 3 dB is subtracted in the equation in FIG. 11C. Below that point noise should be considered constant and the equation is not continuous.

Figure 8:
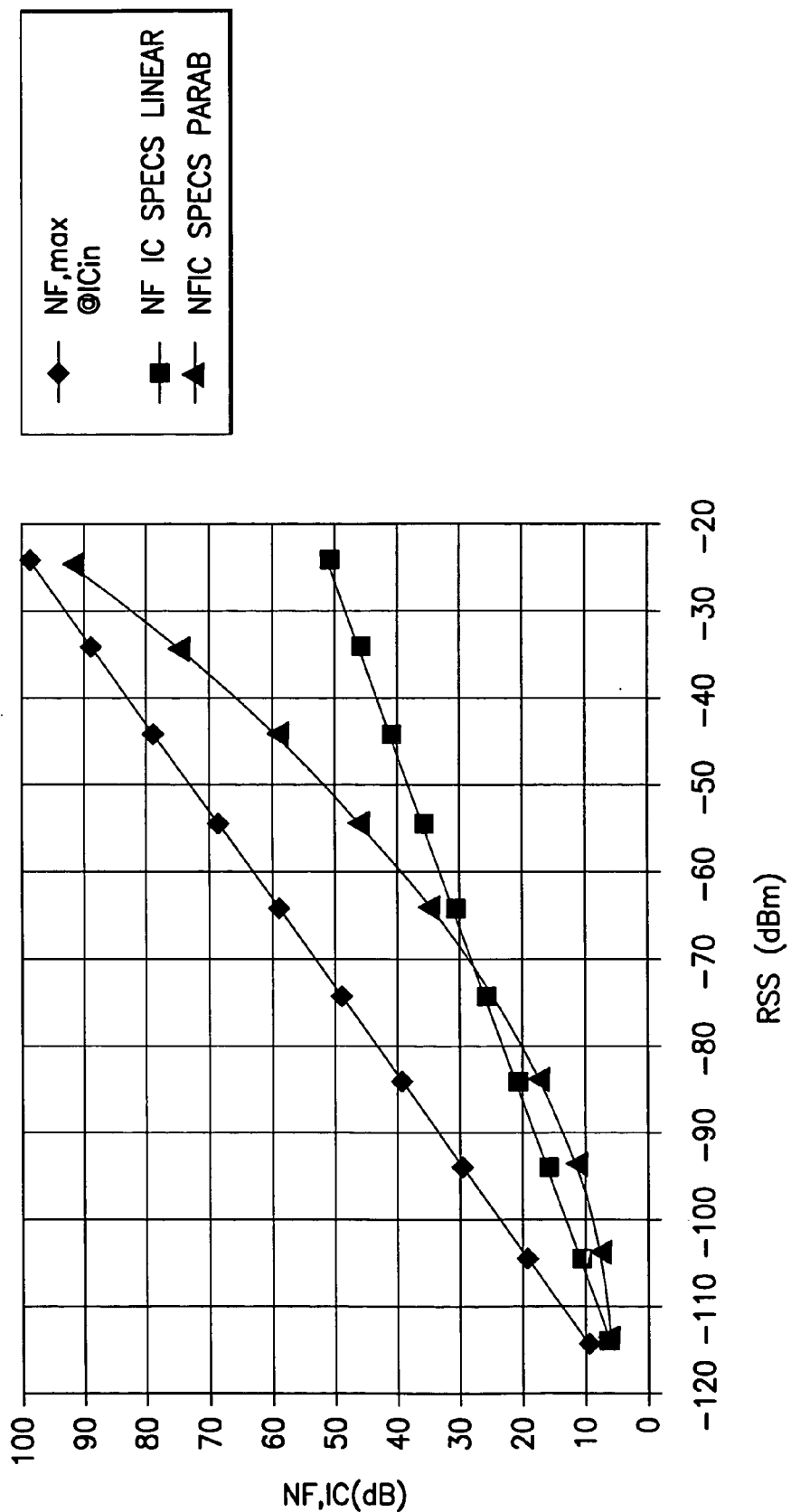
FIG. 8 is a graph that illustrates the maximum noise figure of a receiver IC with linear and parabolic equations, where the parameter k=0.5 is used in the linear model and the parameter m=0.1 is used in the parabolic model.

A hyperbolic function, which avoids this problem, can be readily defined, and also more closely resembles the properties of a typical receiver chain at different gain control values. However, the algorithm may be more difficult and power consuming to realize. The specification can then be given in accordance with the equation shown in FIG. 11D, where the parameter m can be selected by the system designer. The maximum noise (and distortion) level, and the two mathematical models as a function of RSS, are shown in FIG. 8 for a WCDMA system. Similar calculations can be done for other types of radio systems as well.

IIP3

The maximum third-order input intercept point (IIP3) can be defined from the noise figure and from the total acceptable interference. The total interference can be found in accordance with the equation of FIG. 11E, where $P_{IMD3,in}$ is the third-order interference referenced to the input of the receiver. Both NF and $P_{IMD3,in}$ are functions of RSS. The maximum acceptable total interference is defined by the RSS and the minimum required signal-to-noise ratio ($SNR_{min}$) for the current signal quality requirement in the reception as shown in the equation of FIG. 11F. Hence, the maximum level of the third-order interference can be given by the expression of FIG. 11G.

Figure 12:
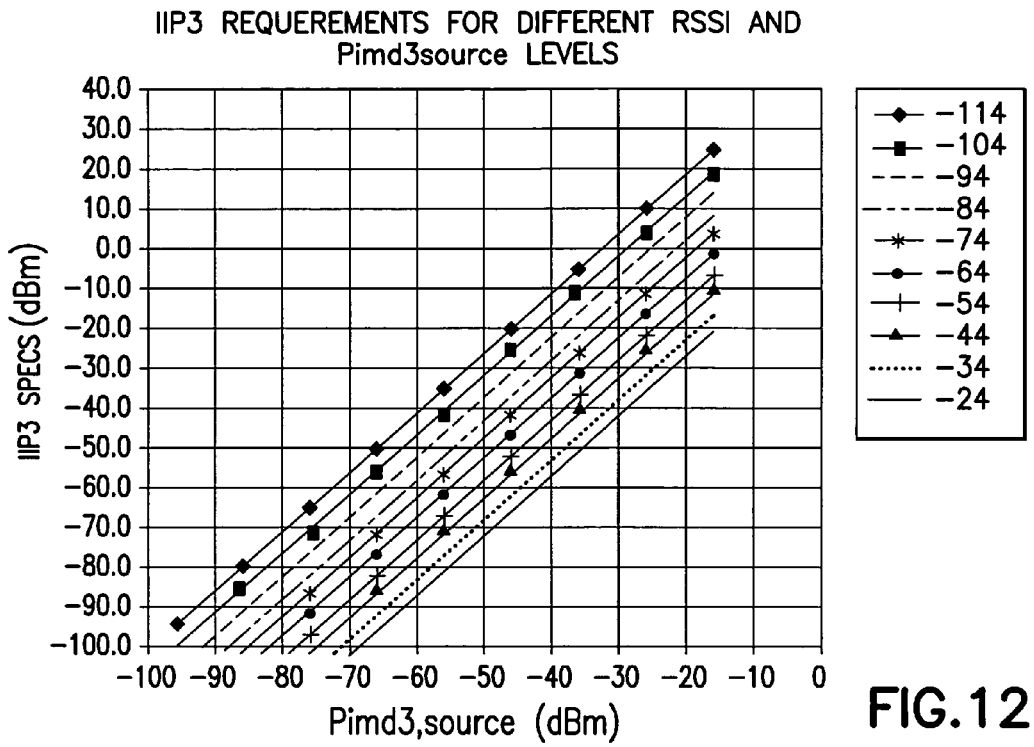
FIG. 12 is a graph that illustrates an example of the IIP3 specification as a function of IMD3 source power for different RSS levels, where a parabolic noise figure model has been used in the calculations.

The specification for the IIP3 can thus be calculated in accordance with the equation shown in FIG. 11H, where $P_{IMD3,source}$ is the power at the input causing distortion due to third-order intermodulation. The IIP3 specification for the noise figure characteristics given by the parabolic function is given for different signal levels (RSS) in FIG. 12.

If there are some other potential non-ideal signal conditions then some certain amount of headroom can be reserved for them as well in the expression of FIG. 11G. Hence, it should be realized that the optimization can be done in the same manner using more than two parameters, such as NF and IIP3 as in this example.

IIP2

Figure 13:
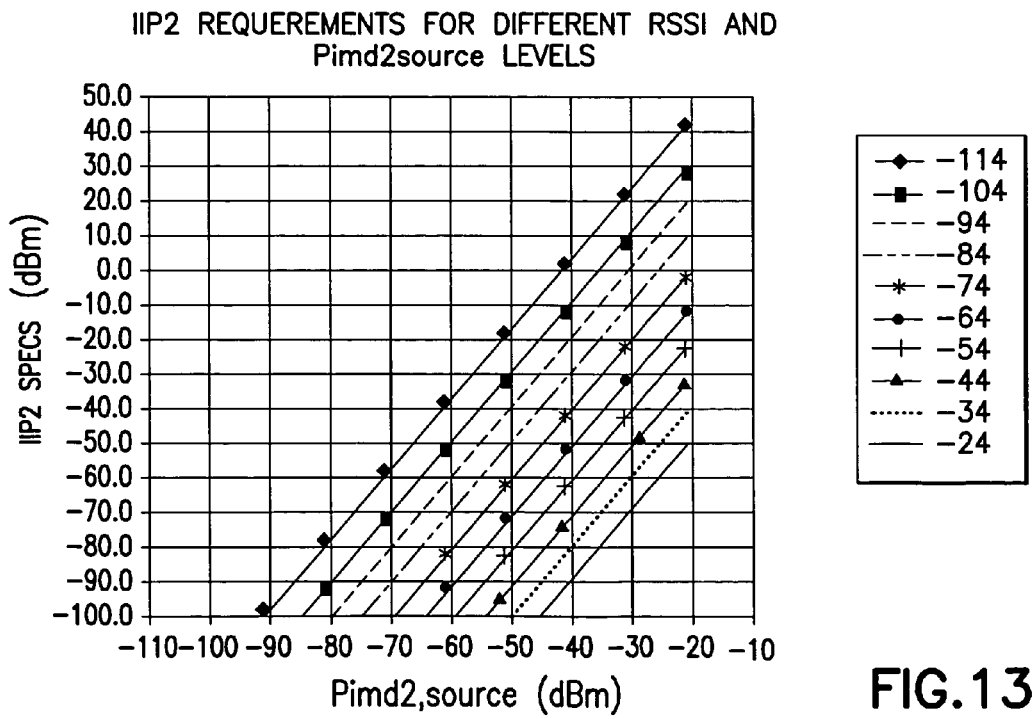
FIG. 13 is a graph that illustrates an example of the IIP2 specification as a function of IMD2 source power for different RSS levels, where the parabolic noise figure model has been used in the calculations.

A similar model as for IIP3 can be also defined for IIP2. However, the amount of amplitude envelope or envelope distortion is more difficult to define than is the intermodulation power. If it is assumed that IIP2 behavior is dominated by a modulated channel having non-constant envelope, the virtual source power ($P_{IMD2,source}$) can be defined as shown in equation 11I, where $P_{block}$ is the average power of the distortion (e.g., in a modulated channel), $\Delta P_{AM}$ is the relative amount of amplitude modulated power in the signal given in dBc and $P_{outband}$ is the power, which aliases out-of-band during squaring of the signal. Hence, $P_{outband}$ is approximately 3 dB in the case of second-order distortion. When specifying several distortion parameters for the receiver their relations should be defined as was done between the noise and the IMD3 distortion earlier. In the case of second-order distortion it may be preferable to 'overspecify' the performance in order to conserve headroom for the other parameters. Of course that can be done only if the parameters can be defined independently, at least to some extent, and only if the maximum requirement is feasible. This is done here by defining the maximum envelope distortion, referred to the input, as shown in equation 11J, where $D_{TOT}$ is the total interference as was defined earlier and $\Delta P_{IMD2}$ is the difference in dB. If the difference is set to, for example, 10 dB, the second-order intermodulation distortion can be only 10% of the total amount. In that case, relatively small headroom should be reserved for the other parameters in the implementation. The specification for IIP2 can thus be written as is shown in the equation of FIG. 11K. IIP2, as a function of IMD2 source power, is shown in FIG. 13 in a similar manner as IIP3 was shown in FIG. 12. The selectable parameters in this example are: $\Delta P_{IMD2}$=10 dB, $\Delta P_{AM}$=10 dB and $P_{outband}$=3 dB.

ICP

The input compression point (ICP) is related to the other nonlinear effects in the receiver circuitry, and a most simplified analysis gives a theoretical result that ICP is 9.6 dB lower than IIP3 when only a single non-linearity dominates in an active circuit. However, in practice the difference is typically between 5 and 15 dBs in RF circuits. IIP3 and ICP cause different mechanisms to deteriorate the signal and therefore their separation may be desirable. The ICP requirement can be calculated separately, and the logic can estimate whether IIP3 or ICP sets the more stringent requirements for the receiver performance and can thereby adjust the receiver accordingly.

The compression of the gain due to the presence of a large blocker ($P_{block}$ or measured $P_{tot}$) can be defined as a function of the interfering power i.e. $A_v(P_{block})$, where $A_V$ is the gain of the receiver. Because the gain compression is related to the power consumption of the receiver the blocking power (i.e. measured total power) can be directly used to calculate the required power consumption of the receiver and to tune the different blocks of the receiver to meet this specification.

The presence of a large blocking signal also increases the noise in the active circuits. Therefore the noise figure of the circuit is a function of the total power. However, relatively large signal levels are needed before the effect becomes significant. It is possible to calculate the noise figure specification, as was shown above, by taking into account the blocking signal, i.e. $NF_{RX}$ is a function of RSS and $P_{block}$, $NF_{RX}(RSS,P_{block})$. Then the other parameters such as IIP3 are calculated in accordance with the more stringent requirements. Another option is to calculate the additional noise caused by the blocker and to then compare it to other interferences. In this case the total interference $D_{TOT}$, which can be compared to the received signal (RSS), can be expressed as shown in the equation of FIG. 11L, where $N_{RX}(P_{block})$ is the additional noise that results from the presence of the blocking signal.

Phase Noise

The phase noise specification can be calculated from the received signal strength (RSS), from the total blocking power ($P_{block}=P_{tot}$) and/or from the measured interfering power levels that are located close to the desired carrier frequency ($P_{nw}$). The maximum acceptable phase noise $N_{ph,max}$ depends on the requirements of the demodulation of the channel. That requirement is significantly relaxed compared to the situation when the phase noise mixes with a large interferer close by the desired carrier. In the latter case, a part of the phase noise will be aliased over the band of interest, thereby further deteriorating the reception. This requirement is one of the strictest from the implementation point of view in several radio systems and therefore is extremely critical for the power consumption. Hence, the phase noise requirement is preferably input to the receiver power consumption optimization logic when it is defined as a function of blocking power, i.e., $N_{ph}(RSS, N_{ph,min}, P_{block}$ and/or $P_{nw})$. Additional headroom is preferably reserved for the phase noise if the distance between the received carrier and a large undesired interferer is not known.

The receiver behavior model(s) 24 are now described in further detail. The required performance parameters are mapped into the receiver performance using logic. Therefore the receiver performance parameters are preferably defined as a function of current consumption over the entire operational range. First, the required parameters and scaling possibilities are defined for each individual receiver block separately. Then the total performance is defined by combining the different blocks. The parameters for each individual block may be determined either by simulations or by measurements, and the combination of the different blocks may be accomplished by simulations, calculations, or by measurements. All of these methods are generally known in the art. However, the large number of parameters makes the optimization very difficult, and the optimization is therefore preferably performed by a different technique. The behavioral model can be similar to all devices (receivers) implemented for the same system and defined beforehand, or it can be modified during fabrication or operation individually for each device to optimize the performance from the system perspective taking into account also process variations etc. The behavioral model potentially has a large number of different options for implementation, and all of these options may be used by the teachings of this invention. Therefore only a relatively simple behavioral model for the receiver is now described, which is also a presently preferred embodiment. The preferred model is one for the entire receiver. However, the model can be partitioned between a plurality of receiver functional blocks, and the logic to distribute power consumption can include an algorithm for internal optimization. Therefore the border between these two blocks labeled as E and F in FIG. 4 should be viewed as being flexible.

FIGS. 9A–9E, collectively referred to as FIG. 9, illustrate behavioral models for certain receiver parameters as a function of power consumption: specifically gain, noise figure, IIP3, noise figure with process variations (dashed lines) and noise figure with different blocking signal levels, respectively. It is neither necessary to describe all of parameters given earlier, nor are the absolute values required to describe the behavior. The relationship between power consumption and certain parameters is one that should be known and understood by one skilled in the art. Instead of the complete receiver the performance parameters can describe also one single block or a group of the receiver blocks. The effect of process variations on the implementation is described in FIG. 9D. If the calibration or verification step cannot be performed (Step H of FIG. 4), the algorithm preferably assumes the worst case condition for each parameter. If the actual performance as a function of a certain parameter can be defined or calibrated the actual value of the particular device (or receiver) can be used. FIG. 9E shows the noise figure as a function of power consumption at three different blocking levels. Using this model the receiver noise figure (NF) can be optimized in the presence of a blocking signal.

The logic block 22 that distributes the power consumption between the different receiver blocks can either use the behavioral model for the entire receiver, or it may use, for example, separate behavioral models for the signal path and LO path, or it may use behavioral models for each receiver block individually. Combinations of these can also be used. In the first case, the logic block 22 determines the minimum necessary power to achieve the required performance parameters according to existing reception conditions. A simple example for three different cases is shown in FIG. 10. In FIG. 10A, a high linearity and a relatively low noise figure are required. However, the linearity requirement clearly sets the power consumption. In FIG. 10B the linearity requirements are relaxed and the noise figure (NF) is the limiting factor for the power consumption. In FIG. 10C both parameters are relaxed, but NF is still the limiting factor. This example shows a method in which the receiver performance is already defined as a function of total power consumption, and a fixed power distribution between blocks is selected beforehand. It is a straightforward approach and allows the use of lookup tables. However, more complex methods capable of yielding improved optimization results with lower power consumption are also possible to implement using this method. The example of FIG. 10A may be considered as a requirement imposed by a certain specification or standard, while the case of FIG. 10C may be the typical case in a fluctuating signal environment.

Although the changes in signal levels are preferably relatively small, the logic 22 that issues the commands to the active circuits may also have knowledge of conditions that relate to the previous state of the receiver. This may be desirable, for example, when signal transients due to the control of the receiver may cause a disturbance to the received signal. Such logic then rules out impossible transitions between certain states, although these transitions may be the best alternatives strictly from the power consumption point of view.

Referring now to Step G of FIG. 4, different blocks in the receiver can be controlled by adjusting the supply current or the supply voltage or by some other technique as described in detail above with respect to FIG. 1. While this invention may employ any suitable control technique, in most cases it will be found that the most effective way to control the RF and analog circuits is to steer the supply current.

The power control of the receiver blocks receives the commands for each individual block from the power distribution logic 22 (e.g., ctrl_LNA, ctrl_VCO, ctrl_synth) and performs the commanded changes at the desired points in time. Synchronization to the digital signal processing block of the receiver is generally not necessary, but in some cases may be desirable.

The signal quality can optionally be checked in Step H of FIG. 4 by comparing, for example, the estimated SIR before and after the power control of the receiver blocks. There should not be any significant difference in the results if the receiver parameters do not dominate the interference. In that case the tuning is definitely acceptable. However, if the receiver parameters have significant contribution to SIR it is possible to estimate whether the SIR remains at an acceptable level after the tuning, i.e., SIR_est>SIR_min, where SIR_min is the minimum acceptable level for the detection. Also, other parameters such as BER, BLER, error vector magnitude (EVM) or cyclic redundancy check (CRC) that can be defined in the receiver can be used in a similar manner to estimate the minimum acceptable signal quality during the reception.

This step is optional as it is possible to define a sufficient amount of headroom for different receiver parameters in order to avoid a situation in which the power consumption tuning can significantly deteriorate the reception. However, an optimal algorithm will minimize the extra margin in the performance, and therefore some mechanism to check the signal quality can be desirable to provide.

Figure 14:
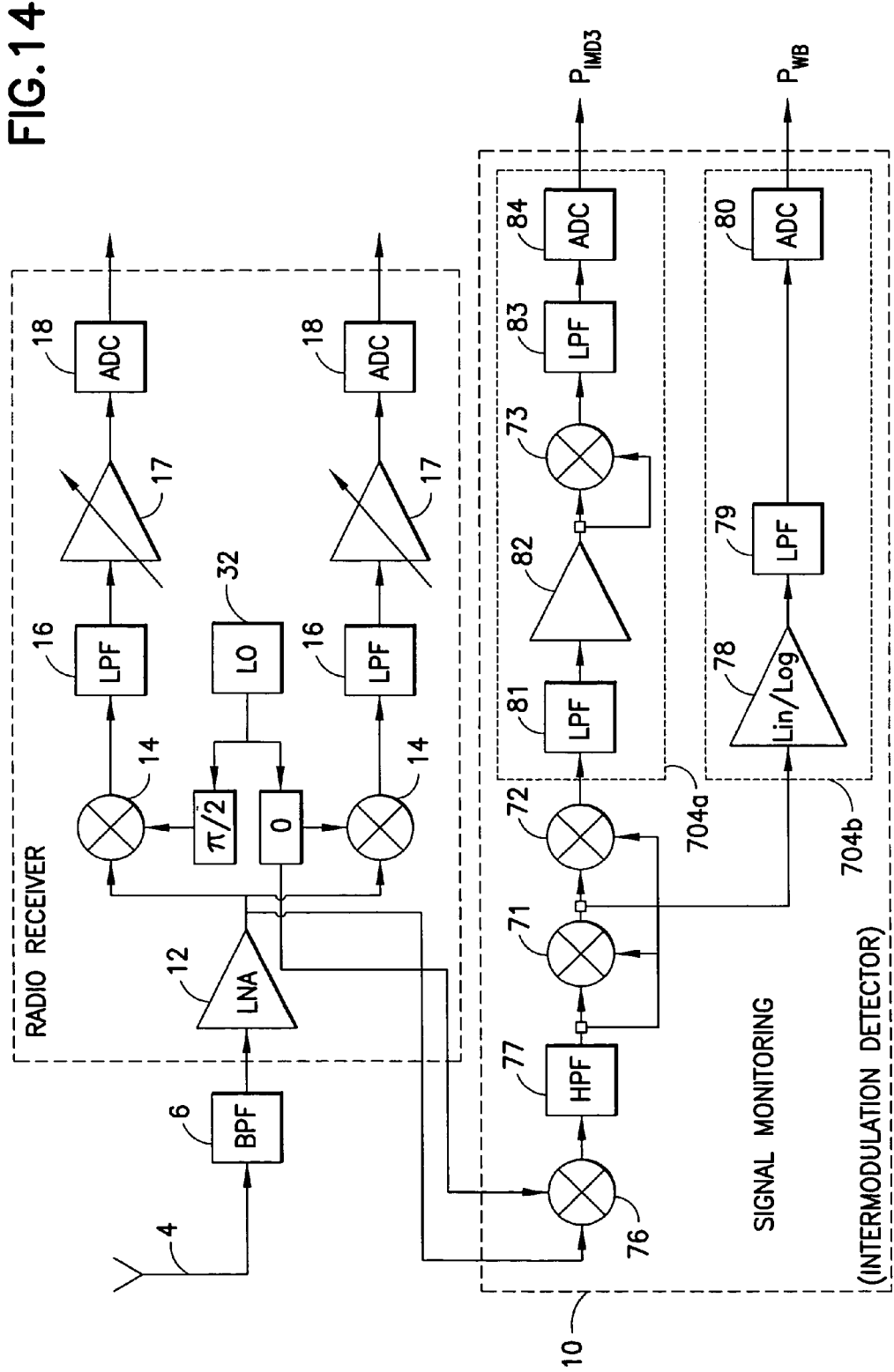
FIG. 14 is a circuit diagram showing a presently preferred embodiment of an intermodulation detector that forms a part of the signal monitoring block shown in FIG. 5.

Reference is now made to FIG. 14 for showing a presently preferred embodiment of the signal monitoring circuit 10, in combination with another view of the RF receiver. The signal monitoring circuit 10, also now referred to as an intermodulation detector (IMD) 10, operates in parallel with the radio receiver and can provide to the receiver tuning logic module signals useful in tuning the radio receiver. The intermodulation detector 10 is essentially a receiver made to be especially sensitive to intermodulation distortion. Using as an input a detector signal derived by the receiver from the received signal, the intermodulation detector 10 provides two signals: a first signal $P_{WB}$ indicating the total power at the input of the receiver detected before or after the first amplifier (LNA 12 in FIG. 5) and a second signal $P_{IMD3}$ indicating essentially the cubed value of the signals falling onto the channel to which the receiver is being tuned (the phenomenon occurring because of the detection of the input signals causing non-linear components in the receiver perceived by the intermodulation detector, and not necessarily occurring to the same extent in the receiver). Another unwanted effect in the receiver under large interfering signals is compression. A large signal in the receiver can compress the gain of the signal path through blocking or increasing the noise in the signal path due to changing the operation conditions of analog circuits. The measurement of wideband power by squaring as indicated in FIG. 14 well known in radio reception. However, the wideband signal taken (tapped) from the node between mixers 71 and 72 is a very useful parameter for the optimization of the radio receiver and therefore has separate output from the intermodulation detector.

The aliasing onto the channel to which the receiver is being tuned occurs because of the detection of the potential sources causing non-linear components in the intermodulation detector, and not necessarily occurring to the same extent in the receiver. The intermodulation detector 10 is essentially a monitoring circuit for a radio receiver that can collect nonlinear components, which will alias onto the channel to which the radio receiver is tuned, with linear operations in a controllable manner from a wide band of frequencies. The IMD circuit 10 is designed to be more sensitive to intermodulation than the actual received signal path and, hence, it can indicate intermodulation sources before they significantly disturb the radio reception. If two strong signals outside of the channel to which the radio receiver is being tuned pass through-non-linear circuits in a radio receiver, and the difference in the frequencies of the two tones is certain, then the two channels are said to produce an intermodulation signal that aliases onto the channel to which the radio receiver is being tuned. The two signals provided by the intermodulation detector 10, the (measured) intermodulation distortion $P_{IMD3}$ and the (measured) total power $P_{WB}$, can be used to adjust the linearity of the radio receiver 10, as well as for the purposes of this invention.

In FIG. 14, besides the signal at the band of interest, there are several other radio channels at different carrier frequencies to which the antenna responds, i.e. the intermodulation detector 10 has a wider input bandwidth than the received channel. Those channels can cause the unwanted intermodulation products aliased to the band of interest if the signals are strong enough. Note that the intermodulation detector 10 is not connected directly to the input of the radio receiver; instead, in the best mode, it measures the signal at the node (i.e. taps the signal at the node) between LNA 12 and mixers 14 (although the measurements with the same intermodulation detector can also be performed by tapping the input of the LNA 12). The intermodulation detector 10 can be used in other radio receiver architectures besides the direct conversion architecture indicated for the radio receiver of FIGS. 5 and 14, and so there are also other nodes in a radio receiver where measurements can be made by the intermodulation detector 10. Also, if there is a need to detect the total power or intermodulation power from a narrower band than will be downconverted with mixer 76, the measurement bandwidth can be limited either at the output of mixer 76 or at the input of mixer 71 with conventional techniques. Such a technique can be for example an additional capacitor connected between the signal ground and the particular node. In addition, the capacitor can be tuned or switched during operation according to prior art design techniques, making it possible to observe whether the source of distortion (either total power or intermodulation) is close to the carrier in which the receiver is being tuned. Such information can be utilized in the receiver tuning logic if needed.

In the implementation shown in FIG. 14, the intermodulation detector 10 takes as input the wideband signal received by the radio receiver after it is amplified by the LNA 12, and mixer 76 mixes the wideband signal with a sinusoid provided by LO 32. The local oscillator 32 provides a signal at the frequency to which the radio receiver is tuned, and so the mixing of the carrier signal and the received signal produces a signal that, when highpass filtered using highpass filter (HPF) 77, no longer includes the frequency to which the radio receiver is tuned. The signal, after highpass filtering, is then provided to mixer 71 where it is mixed with itself, so that it is squared, and therefore provides a measure of the power of the received signal excluding the power at the frequency to which the radio receiver is tuned. In an optional branch of the intermodulation detector 10 the output from the mixer 71 is provided to a subsystem 704$b$ for generating a digital signal indicating $P_{WB}$. In the $P_{WB}$ subsystem 704$b$, the output from the mixer 71 is provided to an amplifier 78 that can be either a linear amplifier or a logarithmic amplifier (indicated as a Lin/Log amplifier 78). The output of amplifier 78 is lowpass filtered using a lowpass filter (LPF) 79 and converted to digital form by an ADC 80, thus providing a signal $P_{WB}$ indicating the power of the received signal, excluding the power at the frequency to which the radio receiver is tuned.

In the main part of the intermodulation detector 10 the output of mixer 71 is also provided as an input to a further mixer 72, where it is mixed with the original output of the highpass filter 77, and so produces as an output essentially the cube of the signal provided by the highpass filter. The cubed output is then processed by a subsystem 704a for providing a digital signal indicating the intermodulation power at the frequency to which the receiver module is tuned. In the subsystem 704a, the cubed output is low-pass filtered by a LPF 81, then amplified by an amplifier 82, indicated (detected) by squaring it using a mixer 73, and lowpass filtered again, using another LPF 83. The result is converted to a digital signal using ADC 84, yielding a digital signal $P_{IMD3}$ indicating the intermodulation power at the frequency to which the radio receiver module 10 is being tuned.

The detector circuit branch including mixer 73 and the lowpass filter 83 and ADC 84 following the mixer 73 are just one example of an implementation for providing a signal indicating $P_{IMD3}$. The function of this circuit branch can of course be accomplished using other implementations, such as for example one in which the mixer 73 is replaced with a digital mixer placed after the ADC.

The methods described above can be implemented with customized logic on the same die with any of the analog circuits, or on a mixed-mode chip, or in a digital ASIC, or by programming a digital signal processor (DSP) or a central processing unit (CPU). The best mode of implementation is most likely one where the control signal to change between the modes comes from the digital ASIC, DSP or CPU, and local logic on an analog or a mixed-mode chip steers the transitions between modes. The RF monitoring circuit 10 is preferably implemented on the same chip with the other RF parts in the receiver. The algorithm used in this invention may be implemented by calculating the values for receiver parameters in real-time or approximate real-time during reception, or by calculating the values in advance for different combinations of signal conditions, and then placing the calculated values in a lookup table, or by any other means that can provide the required logic for the algorithm's execution.

Of course, for a certain embodiment only a sub-set of the foregoing algorithm and circuitry maybe implemented, and thus the form of the actual deployed embodiment can be a function of the receiver system type and architecture and the required accuracy, among other factors.

The method and apparatus disclosed herein provides a powerful real time or substantially real time adaptive function, and can operate continuously or discontinuously. The method and apparatus is also capable of optimizing power consumption based on more than simply the received signal strength, and can also provide and operate on information concerning large interferers. The method and apparatus is also capable of separating input signals causing interference in the band of interest due to intermodulation from other blocking signals. At least theoretically, there is a large difference between blocking and intermodulation as sources of interference from the power scaling perspective. If the logic is based only on blocking, a significantly higher power consumption, on the average, is needed as compared to a case where intermodulation and blocking can be separated from one another. The background for this difference between the two methods is shown in FIG. 2.

The method and apparatus in accordance with this invention also does not require a priori knowledge of the interference in order to be effective, such as knowledge of TX leakage in the RX chain. However, if this information is available it can also be used by the algorithm. Significantly, the receiver need not be designed so as to operate at all times for the worst-case conditions with respect to the received radio spectrum.

Unlike some prior art approaches, the method and apparatus in accordance with this invention are also suitable for use with those receivers having continuous reception, such as DS-CDMA with FDD, and do not require that the receiver be tuned to all possible interfering signal frequencies to be able to scan all possible interferers, otherwise only a selected number of interferers can be estimated. Also, there is no restriction that the interferers cannot be measured during the normal signal reception, which limits the accuracy of some conventional methods.

As was stated above, in CDMA systems where the capacity is limited by noise and interference, and also by other transmitted channels in the RF band of interest, the use of this invention can be made to trade-off between noise, interference and other code channels to achieve the required performance. However, this technique requires one to take some precautions to avoid the disturbance in the power control loop. A solution to this problem has been presented in copending U.S. patent application Ser. No. 10/034,837, filed on even date herewith, by Aarno Päirssinen, Jussi Vepsäläinen and Pauli Seppinen "Method and Apparatus for Reducing Power Consumption in Transceivers in Wireless Communications Systems Having a Power Control Loop" (incorporated by reference herein in its entirety).

Figure 15A:
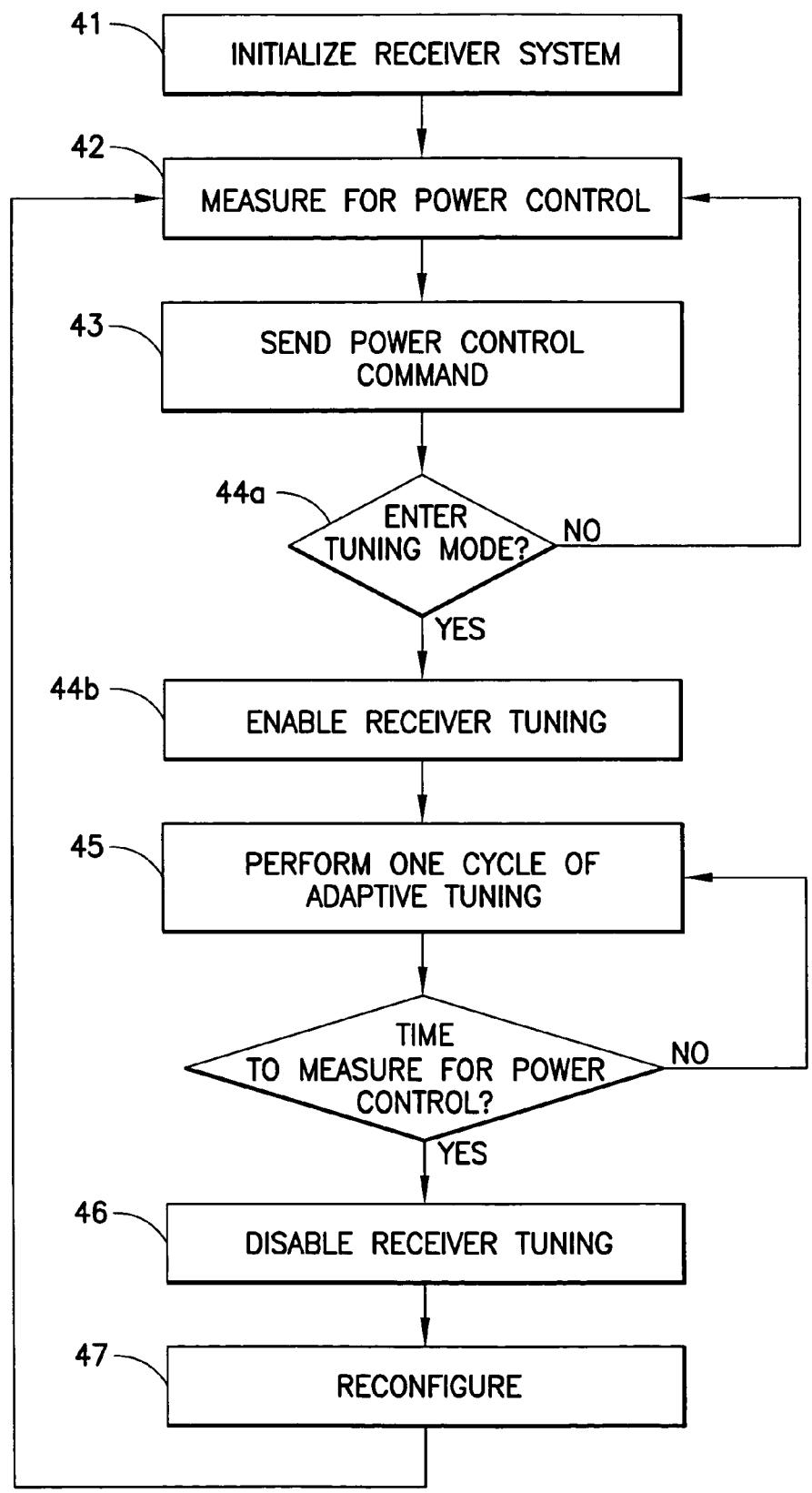
FIG. 15A is a logic flow diagram that illustrates a technique for dynamically tuning a receiver.

Briefly, and referring to FIG. 15A, a flow chart is shown beginning with a first step 41 in which the RF receiver system of a transceiver is initialized. The transceiver is assumed to be communicating with another, second transceiver during the use of this method. In a next step 42, power control measurements are performed with the receiver in a predetermined measurement mode. In a next step 43, power control commands are then sent by the transceiver having the receiver to the communicating transceiver. Then, if the receiver system is programmed in accordance with the invention disclosed in the above-captioned U.S. patent application Ser. No. 10/034,837, filed on even date herewith, "Method and Apparatus for Reducing Power Consumption in Transceivers in Wireless Communications Systems Having a Power Control Loop", the receiver system waits until no measurements are scheduled and so decides when to enter a tuning mode per a decision step 44a. In a next step 44b the receiver tuning is enabled; in a next step 45, a cycle of adaptive tuning is performed (with a receiver tuning logic module sending tuning commands to the radio receiver), and at the end of that cycle, if it is time to again measure for power control, in a next step 46, receiver tuning is disabled, and in a next step 47, the receiver system reconfigures itself for making power control measurements and then returns to step 42 in which it makes the power control measurements. If it is not yet time to measure for power control, the step 45 of performing a cycle of adaptive tuning is repeated.

Figure 15B:
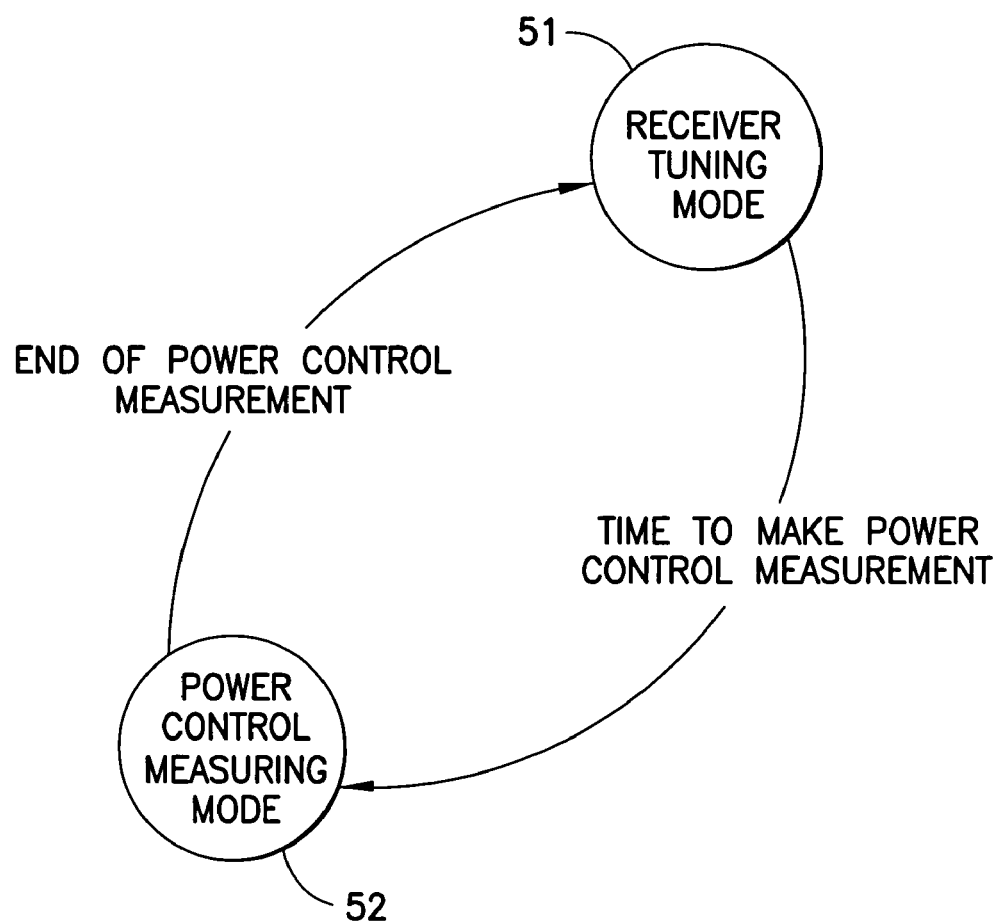
FIG. 15B is a state transition diagram for a receiver system undergoing dynamic tuning in accordance with the logic flow diagram of FIG. 15A.

Referring also to FIG. 15B, as seen from another perspective the receiver system transitions between two different modes 51 and 52. These modes are a receiver tuning mode 51, and a power control measuring mode 52. With the receiver initially in the power control measuring mode 52, the receiver transitions to the receiver tuning mode 51 when the receiver system completes a set of power control measurements. In the receiver tuning mode, the receiver is adjusted (tuned) to one or another adaptively selected internal state. The receiver remains in the receiver tuning mode 51 until it is time to make the next set of power control measurements.

The method and apparatus in accordance with this invention also provides a wider operational range, as switching is not limited when the signal levels are very weak so as not to significantly disturb the reception. Also, the accuracy of the measurement is more precise as the intermodulation products can be separated from the noise and received signal. The method and apparatus can be configured so as to perform the necessary gain control function in the receiver, or it can be combined with an existing receiver gain control function.

These teachings also provide a technique to combine the noise and the linearity performance into the same algorithm, and are thereby capable of reducing the required amount of headroom in the receiver circuit design and implementation.

Furthermore, these teachings provide the possibility to accept higher levels for the intermodulation (two-tone) test and the blocking test in a radio system, since adaptive logic is made available that is scalable according to the intermodulation and blocking. Additional flexibility in the network design is thus made possible, while still enabling the average power consumption in the mobile station to be acceptable.

Thus, while described above in the context of presently preferred embodiments, those skilled in the art should appreciate that the teachings of this invention should not be construed as being limited to only the above-described presently preferred embodiments.

What is claimed is:

1. A method for operating a radio frequency RF receiver, comprising:
   during operation of the RF receiver, periodically determining existing RF receiver operational conditions, by separately measuring levels of signal interference associated with blocking and intermodulation of a received signal;
   determining RF receiver performance requirements based at least in part on the determined existing RF receiver operational conditions, taking into consideration the measured levels of signal interference associated with blocking and intermodulation; and
   allocating power consumption between RF receiver functional blocks in accordance with the determined RF receiver performance requirements using a behavior model of at least one of the RF receiver as a whole and individual functional blocks of the RF receiver, wherein the behavior model maps RF receiver performance requirements onto power consumption allocation.

2. A method as in claim 1, where determining existing RF receiver operational conditions further comprises measuring internal conditions of a transceiver of which the RF receiver is a part.

3. A method as in claim 1, further comprising monitoring resulting RF receiver signal quality to determine if the allocated power consumption comprises an optimum allocation of the power consumption.

4. A method as in claim 1, where said monitoring comprises monitoring the received signal in at least one of the RF, IF and BB sections of the receiver.

5. A method as in claim 1, where separately measuring levels of interference associated with blocking and intermodulation of the received signal comprises measuring the received signal at BB.

6. A method as in claim 1, where signal interference is measured in at least one of the RF, IF and BB sections of the receiver.

7. A method as in claim 1, where determining RE receiver performance requirements comprises determining at least one of: a gain of the RE receiver a noise factor of the RF receiver, a third-order intercept point of the RF receiver, a second-order input intercept point of the RF receiver, an input compression point of the RF receiver and a correct value of gain for the RF receiver.

8. A method as in claim 1, where determining the RF receiver performance requirements comprises determining at least a phase noise of the RF receiver.

9. A method as in claim 8 where determining the phase noise further comprises reducing an associated requirement as a function of a distance in frequency between the received signal and an interfering signal.

10. A method as in claim 1, where allocating power consumption between RF receiver functional blocks further comprises at least one of: varying at least one of a biasing current and a power supply voltage, bypassing at least one RF receiver functional block, switching between RF functional blocks, and changing feedback.

11. A method as in claim 1, where separately measuring further comprises identifying situations where interference being experienced by the RF receiver is dominated by at least one large blocking signal unrelated to intermodulation.

12. A method as in claim 11, where, when allocating power consumption between RF receiver functional blocks, less power consumption is allocated between RF receiver functional blocks than would occur if the signal interference resulted only from intermodulation interference.

13. A method as in claim 1, where the RE receiver performance requirements comprise an input compression point and a third order input intercept point requirements and where determining RE receiver performance requirements further comprises determining which of the input compression point requirement and the third order input intercept point requirement sets a more stringent requirement for RE receiver performance requirements and setting the RE receiver performance requirements based on the determination.

14. A method as in claim 1, where the operations further comprise:
   receiving a desired quality of service;
   where determining RF receiver performance requirements further comprises taking into consideration the desired quality of service;
   determining a minimum power consumption capable of achieving the RE receiver performance requirements; and
   where allocating power consumption between the RF receiver functional blocks further comprises allocating the minimum power consumption between the RE receiver functional blocks in accordance with the determined RF receiver performance requirements.

15. A method as in claim 14, where the desired quality of service is reduced to extend talk time due to low battery charge.

16. A method as in claim 1, further comprising:
   determining whether the allocated power consumption comprises an optimal power consumption; and
   in response to determining that the allocated power consumption comprises an optimal power consumption, reducing RF receiver headroom.

17. A method as in claim 1, where determining RF receiver performance requirements further comprises distributing available headroom in the RF receiver in dependence on at Least a noise figure, interference due to blocking signals and interference due to intermodulation.

18. A method as in claim 1 where determining RF receiver performance requirements further comprises estimating a phase noise specification of a local oscillator of the RF receiver by changing an input signal bandwidth of a signal monitoring circuit.

19. A method as in claim 1 where the RF receiver performance requirements are defined in terms of values for multiple RF receiver operating parameters and where the behavior model maps RF receiver performance requirements onto power consumption allocation in terms of the multiple RF receiver operating parameters.

20. A method as in claim 19 where the separate measurements of levels of signal interference associated with blocking and intermodulation of the received signal occur in a bandwidth wider than a channel bandwidth of the received signal.

21. A method as in claim 1 where the separate measurements of levels of signal interference associated with blocking and intermodulation of the received signal occur in a bandwidth wider than a channel bandwidth of the received signal.

22. A communications device comprising a radio frequency RF receiver, the RF receiver further comprising:
monitoring circuitry, operable during operation of the RF receiver, configured to periodically determine existing RF receiver operational conditions by separately measuring levels of signal interference associated with blocking and intermodulation of a received signal;
control circuitry configured to determine RF receiver performance requirements based at least in part on the determined existing RE receiver operational conditions, taking into consideration the measured levels of signal interference associated with blocking and intermodulation; and
power control circuitry configured to allocate power consumption between RF receiver functional blocks in accordance with the determined RF receiver performance requirements and a behavior model of at least one of the RF receiver as a whole and individual functional blocks of the RE receiver, wherein the behavior model maps RF receiver performance requirements onto power consumption allocation.

23. A communications device as in claim 22, where said monitoring circuitry is further configured to measure internal conditions of a transceiver of which the RF receiver is a part.

24. A communications device as in claim 22, where said power control circuitry is further configured to monitor resulting RF receiver signal quality and to determine if the allocated power consumption comprises an optimum allocation of the power consumption.

25. A communications device as in claim 22, where said monitoring circuitry is further configured to monitor the received signal in at least one of the RF, IF and BB sections of said RF receiver.

26. A communications device as in claim 22, where said control circuitry is configured to determine at least one of: a gain of the RF receiver, a correct value of the gain of the RF receiver, a noise factor of the RF receiver, a third-order input intercept point of the RF receiver, a second-order input intercept point of the RF receiver, an input compression point of the RF receiver, and a phase noise of the RF receiver.

27. A communications device as in claim 22, where said power control circuitry is further configured to perform at least one of: varying at least one of a biasing current and a power supply voltage, bypassing at least one RF receiver functional block, switching between RF receiver functional blocks, and.

28. A communications device as in claim 22 where the power control circuitry is further configured to determine whether the allocated power consumption comprises an optimal power consumption and where the control circuitry is further configured, in response to the power control circuitry determining that the allocated power consumption comprises an optimal power consumption, to reduce RF receiver headroom.

29. A communication device as in claim 22 where the RF receiver performance requirements comprise an input compression point requirement and a third order input intercept point requirement.

30. A communication device as in claim 29 where the control circuitry is further configured to determine which of the input compression point requirement and the third order input intercept point requirement sets a more stringent requirement for the RF receiver performance requirements and to set the RF receiver performance requirements based on the determination.

31. A communication device as in claim 22 where said monitoring circuitry is further configured to monitor the received signal at BB and where monitoring the received signal at BB comprises measuring at least one of RSS, SIR, Ec/Io, BER and BLER.

32. A communications device as in claim 22 where the RF receiver performance requirements are defined in terms of values for multiple RF receiver operating parameters and where the behavior model maps RF receiver performance requirements onto power consumption allocation in terms of the multiple RF receiver operating parameters.

33. A communications device as in claim 32 where the separate measurements by the monitoring circuitry of levels of signal interference associated with blocking and intermodulation of the received signal occur in a bandwidth wider than a channel bandwidth of the received signal.

34. A communications device as in claim 22 where the separate measurements by the monitoring circuitry of levels of signal interference associated with blocking and intermodulation of the received signal occur in a bandwidth wider than a channel bandwidth of the received signal.

35. A communications device comprising a radio frequency RF receiver, the RF receiver further comprising:
monitoring circuitry, operable during operation of the RF receiver, configured to periodically determine existing RF receiver operational conditions by separately measuring levels of signal interference associated with blocking and intermodulation of a received signal;
control circuitry configured to determine RF receiver performance requirements based at least in part on the determined existing RF receiver operational conditions, taking into consideration the measured levels of signal interference associated with blocking and intermodulation; and power control circuitry configured to allocate reception performance power between RF receiver functional blocks in accordance with the determined RF receiver performance requirements and in accordance with a behavior model of at least one of the RF receiver as a whole and individual functional blocks of the RF receiver, wherein the behavior model maps RF receiver performance requirements onto reception performance power allocation.

36. A communications device as in claim 35 where the control circuitry is further configured to determine at least values for an input compression point requirement and a third-order input intercept point requirement for the RF receiver, based at least on the separate measurement of levels of signal interference associated with blocking and intermodulation of the received signal.

37. A communications device as in claim 35 where the control circuitry is further configured to compare the measured levels of signal interference associated with blocking and intermodulation of the received signal when determining RF receiver performance requirements.

38. A communications device as in claim 35 where the control circuitry is further configured to determine that signal interference being experienced by the RF receiver is dominated by a large blocking signal unrelated to intermodulation.

39. A communications device as in claim 38 where the power control circuitry is further configured to allocate less power consumption between RF receiver functional blocks than in the situation where the signal interference resulted from only intermodulation interference.

40. A communications device as in claim 35 where the monitoring circuitry is further configured to determine that at least one large interfering signal is present, and where the control circuitry is further configured to reserve only a portion of headroom of a signal-to-interference ratio of the RF receiver for noise figure requirements, with the remaining portion being reserved for other non-ideal characteristics of the Rf receiver.

41. A communications device as in claim 35 where the control circuitry is further configured to determine a phase noise requirement when determining RF receiver performance requirements.

42. A communications device as in claim 41 where the control circuitry is further configured to reduce the phase noise requirement as a function of a distance in frequency between the received signal and an interfering signal.

43. A communications device as in claim 35 where the control circuitry is further configured to receive a desired quality of service and the power control circuitry is further configured to optimize RF receiver performance according to a minimum necessary power consumption necessary to obtain the desired quality of service.

44. A communications device as in claim 43 where the desired quality of service is reduced to extend talk time due to a low battery charge.

45. A communications device as in claim 35 where the control circuitry is further configured to distribute available headroom in the RF receiver based on at least: a noise figure, interference due to blocking signals, and interference due to intermodulation.

46. A communications device as in claim 35 where the control circuitry is further configured to estimate a phase noise specification of a local oscillator of the RF receiver by changing an input signal bandwidth of a signal monitoring circuit.

47. A communications device of claim 35 where the RF receiver performance requirements are defined in terms of values for multiple RF receiver operating parameters and where the behavior model maps RF receiver performance requirements onto reception performance power allocation in terms of the multiple RF receiver operating parameters.

48. A communications device of claim 35 where the monitoring circuitry further comprises an intermodulation detector configured to perform the separate measurements of levels of signal interference associated with blocking and intermodulation of the received signal in a bandwidth wider than a channel bandwidth of the received signal.

49. A radio frequency RF receiver comprising:
monitoring circuitry, operable during operation of the RF receiver, configured to periodically determine existing RF receiver operational conditions by separately measuring levels of signal interference associated with blocking and intermodulation of a received signal;
control circuitry configured to determine RF receiver performance requirements based at least in part on the determined existing RF receiver operational conditions, taking into consideration the measured levels of signal interference associated with blocking and intermodulation; and
power control circuitry configured to allocate power consumption between RF receiver functional blocks in accordance with the determined RF receiver performance requirements and in accordance with a behavior model of at least one of the RF receiver as a whole and individual functional blocks of the RF receiver, wherein the behavior model maps RF receiver performance requirements onto power consumption allocation.

50. A communications device as in claim 49 where the RF receiver performance requirements comprise an input compression point requirement and a third order input intercept point requirement and where the control circuitry is further configured to determine which of the input compression point requirement and the third order input intercept point requirement sets a more stringent requirement for the RF receiver performance requirements and to set the RF receiver performance requirements based on the determination.

51. A radio frequency RF receiver as in claim 49 where the RF receiver performance requirements are defined in terms of values for multiple RF receiver operating parameters and where the behavior model maps RF receiver performance requirements onto power consumption allocation in terms of the multiple RF receiver operating parameters.

52. A radio frequency RF receiver as in claim 49 where the separate measurements by the monitoring circuitry of levels of signal interference associated with blocking and intermodulation of the received signal occur in a bandwidth wider than a channel bandwidth of the received signal.

53. A communications device comprising a radio frequency RF receiver, the RF receiver further comprising:
means, operable during operation of the RF receiver, for periodically determining existing RF receiver operational conditions by separately measuring levels of signal interference associated with blocking and intermodulation of a received signal;
means for determining RF receiver performance requirements based, at least in part, on the determined existing RF receiver operational conditions, taking into consideration the measured levels of signal interference associated with blocking and intermodulation; and
means for allocating power consumption between RF receiver functional blocks in accordance with the determined RF receiver performance requirements and a behavior model of at least one of the RF receiver as a whole and individual functional blocks of the RF receiver, wherein the behavior model maps RF receiver performance requirements onto power consumption allocation.

54. A communications device as in claim 53 where the RF receiver performance requirements are defined in terms of values for multiple RF receiver operating parameters and where the behavior model maps RF receiver performance requirements onto power consumption allocation in terms of the multiple RF receiver operating parameters.

55. A communications device as in claim 54 where the separate measurements, by the means for periodically determining, of levels of signal interference associated with blocking and intermodulation of the received signal occur in a bandwidth wider than a channel bandwidth of the received signal.

56. A method of operating a radio frequency RF receiver comprised of RF receiver functional blocks, the method comprising:
during operation of the RF receiver, periodically determining existing RF receiver signal conditions by separately measuring levels of blocking power and intermodulation interference of a received signal;
determining RF receiver performance requirements, by separately determining input compression point and third-order input intercept point requirements, based at least in part on the determined existing RF receiver signal conditions, allocating power consumption between the RF receiver functional blocks in accordance with the determined RF receiver performance requirements, and
using a behavior model of the RF receiver as a whole and/or behavior models of individual ones of the RF receiver functional blocks, for mapping said RF receiver performance requirements onto the power consumption allocation.

57. A method as in claim 56 where the RF receiver performance requirements are defined in terms of values for multiple RF receiver operating parameters and where the behavior model maps RF receiver performance requirements onto power consumption allocation in terms of the multiple RF receiver operating parameters.

58. A method as in claim 56 where the separate measurements of levels of signal interference associated with blocking and intermodulation of the received signal occur in a bandwidth wider than a channel bandwidth of the received signal.

59. A communications device comprising:
a radio frequency RF receiver which comprises RF receiver functional blocks;
monitoring circuitry, operable during operation of the RF receiver, configured to periodically determine existing RF receiver signal conditions by separately measuring levels of blocking power and intermodulation interference of a received signal and further configured to determine RF receiver performance requirements, by separately determining an input compression point requirement and a third-order input intercept point requirement, based at least in part on the determined existing RF receiver signal conditions; and
power control circuitry configured to allocate power consumption between RF receiver functional blocks in accordance with the determined RE receiver performance requirements, the power control circuitry comprising a logic component configured to implement a behavior model of the RF receiver as a whole and/or behavior models of individual ones of the RF receiver functional blocks, wherein the logic component is further configured to map said RF receiver performance requirements onto power consumption allocation.

60. A communications device as in claim 59 where the RF receiver performance requirements are defined in terms of values for multiple RF receiver operating parameters and where the behavior model maps RF receiver performance requirements onto power consumption allocation in terms of the multiple RF receiver operating parameters.

61. A communications device as in claim 59 where the separate measurements by the monitoring circuitry of levels of signal interference associated with blocking and intermodulation of the received signal occur in a bandwidth wider than a channel bandwidth of the received signal. pg,47

62. A radio frequency RF integrated circuit comprising:
monitoring circuitry, operable during operation of the RF receiver, configured to periodically determine existing RF receiver operational conditions by separately measuring levels of signal interference associated with blocking and intermodulation of a received signal;
control circuitry configured to determine RF receiver performance requirements based at least in part on the determined existing RF receiver operational conditions, taking into consideration the measured levels of signal interference associated with blocking and intermodulation; and
power control circuitry configured to allocate power consumption between RF receiver functional blocks in accordance with the determined RF receiver performance requirements and in accordance with a behavior model of at least one of the RF receiver as a whole and individual functional blocks of the RF receiver, wherein the behavior model maps RF receiver performance requirements onto power consumption allocation.

63. A radio frequency RF integrated circuit as in claim 62 where the RF receiver performance requirements are defined in terms of values for multiple RF receiver operating parameters and where the behavior model maps RF receiver performance requirements onto power consumption allocation in terms of the multiple RF receiver operating parameters.

64. A radio frequency RF integrated circuit as in claim 62 where the separate measurements by the monitoring circuitry of levels of signal interference associated with blocking and intermodulation of the received signal occur in a bandwidth wider than a channel bandwidth of the received signal.

* * * * *

UNITED STATES PATENT AND TRADEMARK OFFICE
CERTIFICATE OF CORRECTION

| | |
|---|---|
| PATENT NO. | : 7,299,021 B2 |
| APPLICATION NO. | : 10/243331 |
| DATED | : November 20, 2007 |
| INVENTOR(S) | : Parssinen et al. |

It is certified that error appears in the above-identified patent and that said Letters Patent is hereby corrected as shown below:

IN THE CLAIMS:

Claim 6, please delete the claim in its entirety and replace with the following:
--6. A method as in claim 5, where measuring the received signal at BB results in a measurement of at least one of RSS, SIR, Ec/Io, BER and BLER.--

Claim 7, column 21, line 63 delete "RE" and replace with --RF--; line 65, delete "RE" and replace with --RF--.

Claim 10, column 22, line 14 after "RF" insert --receiver--.

Claim 13, column 22, line 25 delete "RE" and replace with --RF--.; line 28, delete "RE" and replace with --RF--; line 32, delete "RE" and replace with --RF--; line 33, delete "RE" and replace with --RF--.

Claim 14, column 22, line 42 delete "RE" and replace with --RF--; line 46, delete "RE" and replace with --RF--.

Claim 22, column 23, line 26 delete "RE" and replace with --RF--; line 35 delete "RE" and replace with --RF--.

Claim 27, column 23, line 64 at the end of the claim, after "and" insert --changing feedback--.

Claim 59, column 27, line 50, delete "RE" and replace with --RF--.

UNITED STATES PATENT AND TRADEMARK OFFICE
CERTIFICATE OF CORRECTION

PATENT NO.       : 7,299,021 B2
APPLICATION NO.  : 10/243331
DATED            : November 20, 2007
INVENTOR(S)      : Parssinen et al.

It is certified that error appears in the above-identified patent and that said Letters Patent is hereby corrected as shown below:

Claim 61, column 28, line 16 after the period "." Delete "pg,47".

Signed and Sealed this

Sixth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,299,021 B2
APPLICATION NO. : 10/243331
DATED : November 20, 2007
INVENTOR(S) : Parssinen et al.

It is certified that error appears in the above-identified patent and that said Letters Patent is hereby corrected as shown below:

IN THE CLAIMS:

Column 21, lines 60-62, Claim 6, please delete the claim in its entirety and replace with the following: --6. A method as in claim 5, where measuring the received signal at BB results in a measurement of at least one of RSS, SIR, Ec/Io, BER and BLER.--

Claim 7, column 21, line 63 delete "RE" and replace with --RF--; line 65, delete "RE" and replace with --RF--.

Claim 10, column 22, line 14 after "RF" insert --receiver--.

Claim 13, column 22, line 25 delete "RE" and replace with --RF--.; line 28, delete "RE" and replace with --RF--; line 32, delete "RE" and replace with --RF--; line 33, delete "RE" and replace with --RF--.

Claim 14, column 22, line 42 delete "RE" and replace with --RF--; line 46, delete "RE" and replace with --RF--.

Claim 22, column 23, line 26 delete "RE" and replace with --RF--; line 35 delete "RE" and replace with --RF--.

Claim 27, column 23, line 64 at the end of the claim, after "and" insert --changing feedback--.

Claim 59, column 27, line 50, delete "RE" and replace with --RF--.

UNITED STATES PATENT AND TRADEMARK OFFICE
CERTIFICATE OF CORRECTION

PATENT NO. : 7,299,021 B2
APPLICATION NO. : 10/243331
DATED : November 20, 2007
INVENTOR(S) : Parssinen et al.

It is certified that error appears in the above-identified patent and that said Letters Patent is hereby corrected as shown below:

Claim 61, column 28, line 16 after the period "." Delete "pg,47".

This certificate supersedes the Certificate of Correction issued May 6, 2008.

Signed and Sealed this

Third Day of June, 2008

JON W. DUDAS
*Director of the United States Patent and Trademark Office*